US012744580B2

(12) United States Patent
Shahmohammadian et al.

(10) Patent No.: US 12,744,580 B2
(45) Date of Patent: Sep. 22, 2026

(54) SENSOR-AIDED BEAM MANAGEMENT AT USER EQUIPMENT

(71) Applicant: Samsung Electronics Co., Ltd., Gyeonggi-do (KR)

(72) Inventors: Hoda Shahmohammadian, San Diego, CA (US); Jung Hyun Bae, San Diego, CA (US); Jungwon Lee, San Diego, CA (US); Dongwoon Bai, San Diego, CA (US)

(73) Assignee: Samsung Electronics Co., Ltd. (KR)

( * ) Notice: Subject to any disclaimer, the term of this patent is extended or adjusted under 35 U.S.C. 154(b) by 572 days.

(21) Appl. No.: 18/341,324

(22) Filed: Jun. 26, 2023

(65) Prior Publication Data

US 2024/0204855 A1 Jun. 20, 2024

Related U.S. Application Data

(60) Provisional application No. 63/432,662, filed on Dec. 14, 2022.

(51) Int. Cl.

| | |
|---|---|
| ***H04B 7/08*** | (2006.01) |
| ***H04B 7/06*** | (2006.01) |
| ***H04W 64/00*** | (2009.01) |

(52) U.S. Cl.
CPC ........... *H04B 7/086* (2013.01); *H04B 7/0617* (2013.01); *H04B 7/0854* (2013.01); *H04B 7/0857* (2013.01); *H04W 64/006* (2013.01)

(58) Field of Classification Search
CPC .... H04B 7/086; H04B 7/0617; H04B 7/0854; H04B 7/0857; H04B 7/0695; H04B 7/088; H04B 17/328; H04B 17/336; H04W 64/006; H04W 64/00; H04L 25/0256
See application file for complete search history.

(56) References Cited

U.S. PATENT DOCUMENTS

| | | | | |
|---|---|---|---|---|
| 9,253,592 | B1 * | 2/2016 | Moscovich | H04W 4/80 |
| 10,447,374 | B2 | 10/2019 | Rune et al. | |
| 10,841,819 | B2 | 11/2020 | Yu et al. | |
| 11,245,456 | B2 | 2/2022 | Marinier et al. | |

(Continued)

FOREIGN PATENT DOCUMENTS

| | | |
|---|---|---|
| IN | 201841012895 | 10/2019 |
| WO | WO 2022/133933 | 6/2022 |

OTHER PUBLICATIONS

Duk-Sun Shim et al., “Application of Motion Sensors for Beam-Tracking of Mobile Stations in mmWave Communication Systems”, Sensors 2014, 14, 19622-19638, pp. 17.

(Continued)

*Primary Examiner* — Tejis Daya
(74) *Attorney, Agent, or Firm* — The Farrell Law Firm, P.C.

(57) ABSTRACT

Methods and apparatuses are provided in which position information is determined corresponding to movement of a user equipment (UE) from first local coordinates to second local coordinates. Receive angles of the UE are derived from the position information of the UE. A beamforming weight of the UE is determined based on the derived receive angles of the UE. The beamforming weight is configured such that a beam direction of the second local coordinates matches a beam direction of the first local coordinates.

19 Claims, 9 Drawing Sheets

(56) References Cited

U.S. PATENT DOCUMENTS

| | | | | |
|---|---|---|---|---|
| 2012/0230380 | A1* | 9/2012 | Keusgen | H04B 7/0695 375/227 |
| 2017/0111852 | A1* | 4/2017 | Selén | H04W 48/16 |
| 2017/0195834 | A1* | 7/2017 | Na | G01S 5/0249 |
| 2020/0204237 | A1* | 6/2020 | Zhou | H04B 7/0408 |
| 2020/0374713 | A1* | 11/2020 | Bogatin | H04W 8/186 |
| 2021/0328653 | A1* | 10/2021 | Tang | H04B 7/088 |
| 2022/0352960 | A1 | 11/2022 | Park et al. | |
| 2023/0103220 | A1* | 3/2023 | Pezeshki | H04B 7/08 370/329 |
| 2023/0291444 | A1* | 9/2023 | Nammi | H04B 7/063 |

OTHER PUBLICATIONS

Zichen Qi et al., "Three-Dimensional Millimetre Wave Beam Tracking Based on Handset MEMS Sensors with Extended Kalman Filtering".

Radio Propagation and Technologies for 5G. Mar. 6, 2016, pp. 7.

Zichen Qi, "Three-Dimensional Beam Tracking for Wireless Communications Systems", Feb. 2019, University of Sheffield, pp. 77.

Sentiance Team, "Driving behavior modeling using smart phone sensor data", https://sentiance.com/driving-behavior-modeling-using-smart-phone-sensor-data, May 25, 2023, pp. 17.

3GPP TR 36.897 V13.0.0 (Jun. 2015), Technical Report, pp. 58.

3GPP TR 38.901 V17.0.0 (Mar. 2022), Technical Report, pp. 98.

ZTE, ZTE Microelectronics, "Further clarification on assumptions for Phase 1", 3GPP TSG RAN WG1 NR Ad-Hoc Meeting R1-1700144 Spokane, USA, Jan. 16-20, 2017, pp. 8.

Hyoungju Ji et al., "Overview of Full-Dimension MIMO in LTE-Advanced Pro", arXiv:1601.00019v4 [cs.IT] Aug. 10, 2016, pp. 22.

* cited by examiner 102
110
108
106
104

SENSOR-AIDED BEAM MANAGEMENT AT USER EQUIPMENT

CROSS-REFERENCE TO RELATED APPLICATION

This application claims the priority benefit under 35 U.S.C. § 119(e) of U.S. Provisional Application No. 63/432,662, filed on Dec. 14, 2022, the disclosure of which is incorporated by reference in its entirety as if fully set forth herein.

TECHNICAL FIELD

The disclosure generally relates to beam management at a user equipment (UE). More particularly, the subject matter disclosed herein relates to improvements to beam management and tracking mechanisms at the UE using position and rotation angles of the UE.

SUMMARY

In fifth generation (5G) new radio (NR) technology, beam management procedures include at least the following aspects. Beam sweeping includes an operation of covering a spatial area with beams transmitted and received during a time interval in a predetermined manner. Beam measurement allows a UE to measure characteristics of received beamformed signals. Beam reporting allows a UE to report information of beamformed signals based on beam measurement. Beam determination allows a gNodeB (gNB) or a UE to select its own transmit (Tx)/receive (Rx) beams. Beam maintenance allows a gNB or a UE to maintain candidate beams by beam tracking or refinement in order to adapt to the channel changes due to UE movement or blockage. Beam recovery allows a UE to identify new candidate beams after detecting a beam failure, and subsequently provide a gNB of a beam recovery request with information indicating the new candidate beam.

Downlink (DL) beam refinement includes three procedures: gNB beam sweeping and UE beam sweeping; gNB beam sweeping only; and UE beam sweeping only.

There are a set of N Tx beams at the gNB and a set of M Rx beams at the UE for the gNB and UE beam sweeping procedure. Each of the N Tx beams is transmitted M times from the gNB side so that they may be received at the UE using M beams per Tx beam. Therefore, N×M reference signal (RS) transmission instants are required only for the gNB and UE beam sweeping procedure.

Millimeter wave (mmWave) channels have a fast varying characteristic due to environmental changes such as, for example, link blockage and/or UE mobility, rotation, or displacement.

One issue with the above approach is that a beam management procedure for mmWave channels may involve a large amount of training time and network resources. For example, due to the number of RS transmission instants for the gNB and UE beam sweeping procedure, a large exhaustive search mechanism may be required at the UE for every beam sweeping event to find a best transmission beam pair.

To overcome these issues, systems and methods are described herein for improving beam management and tracking mechanisms at a UE with prior knowledge of the UE's position and/or rotation angles through its motion sensors. Accordingly, the UE would be able to correct its beamforming or steering angle toward a best direction as it moves or rotates, only relying on observations of previous measurements, and not new measurements and beam sweeping at the UE. A UE beam may be systematically updated when a certain structure (e.g., a discrete Fourier transform (DFT) beam) is available. An angle and a Rx beam relationship may be established offline (through an exhaustive approach). A UE receive beam may be updated based on the resulting angle after UE movement or the channel may be predicted and/or estimated after rotation with acceptable mean square error (MSE) performance, and thus, the UE receive beamforming weights may be updated accordingly.

The above approaches improve on previous methods because more efficient beam management is provided with less resource overhead, less signaling overhead, and less beam training time.

In an embodiment, a method includes determining position information corresponding to movement of a UE from first local coordinates to second local coordinates. Receive angles of the UE are derived from the position information of the UE. A beamforming weight of the UE is determined based on the derived receive angles of the UE. The beamforming weight is configured such that a beam direction associated with the second local coordinates matches a beam direction associated with the first local coordinates.

In an embodiment, a method includes estimating a first beamforming channel of a UE associated with first local coordinates. Position information is determined corresponding to movement of the UE from the first local coordinates to second local coordinates. A second beamforming channel of the UE is estimated corresponding to the second local coordinates based on the first beamforming channel and the position information. A beamforming weight is determined for the second local coordinates based on the second beamforming channel and a decision metric. The beamforming weight corresponds to a change in a beam direction associated with the second local coordinates.

In an embodiment, a UE includes a processor and a non-transitory computer readable storage medium storing instructions. When executed, the instructions cause the processor to determine position information corresponding to movement of a UE from first local coordinates to second local coordinates. Receive angles of the UE are derived from the position information of the UE. A beamforming weight of the UE is determined based on the derived receive angles of the UE. The beamforming weight is configured such that a beam direction associated with the second local coordinates matches a beam direction associated with the first local coordinates.

BRIEF DESCRIPTION OF THE DRAWINGS

In the following section, the aspects of the subject matter disclosed herein will be described with reference to exemplary embodiments illustrated in the figures, in which:

FIG. 5 is a diagram illustrating a single panel antenna array based on a 3rd generation partnership project (3GPP) model, according to an embodiment;

DETAILED DESCRIPTION

Figure 1:
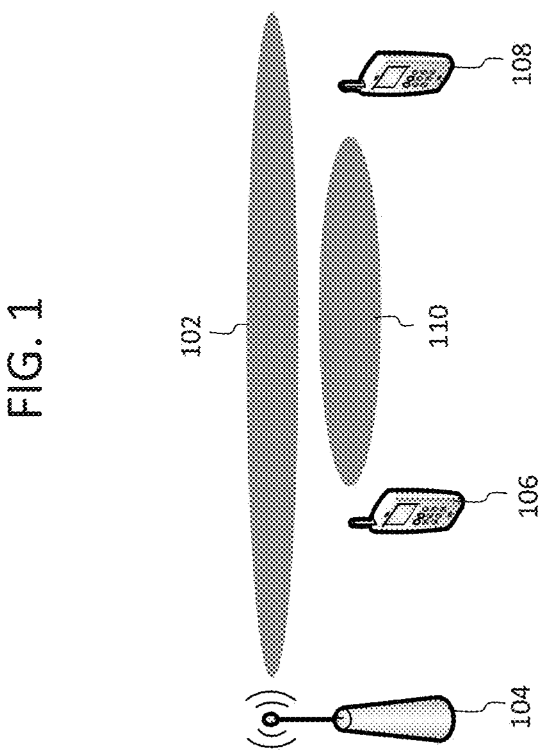
FIG. 1 is a diagram illustrating a communication system, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

FIG. 1 is a diagram illustrating a communication system, according to an embodiment. In the architecture illustrated in FIG. 1, a control path 102 may enable the transmission of control information through a network established between a base station or a gNB 104, a first UE 106, and a second UE 108. A data path 110 may enable the transmission of data (and some control information) on a sidelink between the first UE 106 and the second UE 108. The control path 102 and the data path 110 may be on the same frequency or may be on different frequencies.

Due to fast varying characteristics of mmWave channels, traditional beam management processes may involve a large amount of training time and network resources. Herein, embodiments are provided that improve beam management and tracking mechanisms at a UE with prior knowledge of the UE's position and/or rotation angles. UE position and/or rotation angles information may be made available at the UE through its motion sensors (e.g., accelerometers, gyroscopes, and geo-magnetic sensors). With such a capability, the UE may be able to correct its beamforming or steering angle toward a best direction (e.g., a direction of highest reference signal resource power (RSRP)) as it moves or rotates. It may be assumed that UE position and/or rotation angles information is provided with acceptable accuracy to track and update a best spatial beam at the UE. Accordingly, an efficient beam management and tracking mechanism may be provided at the UE as it moves or rotates.

Herein, all angles that are represented without prime notation are defined in the global coordinate, all angles represented with prime notation (') are in the UE local coordinate before UE rotation and/or displacement, and all angles represented with double prime notation (") are in the UE local coordinate after UE rotation and/or displacement.

UE rotation or displacement may affect the UE's receive angles. Receive angles include a zenith angle of arrival (ZOA) $\theta'_{org}$ and an azimuth angle of arrival (AOA) $\varphi'_{org}$ at the UE and are given in the UE's local coordinate at the time of beam management. For UE rotation, the new ZOA angle $\theta''_{new}$ and AOA angle $\varphi''_{new}$ in the UE's new local coordinate may be easily derived according to spherical coordinate transition equations.

Figure 2:
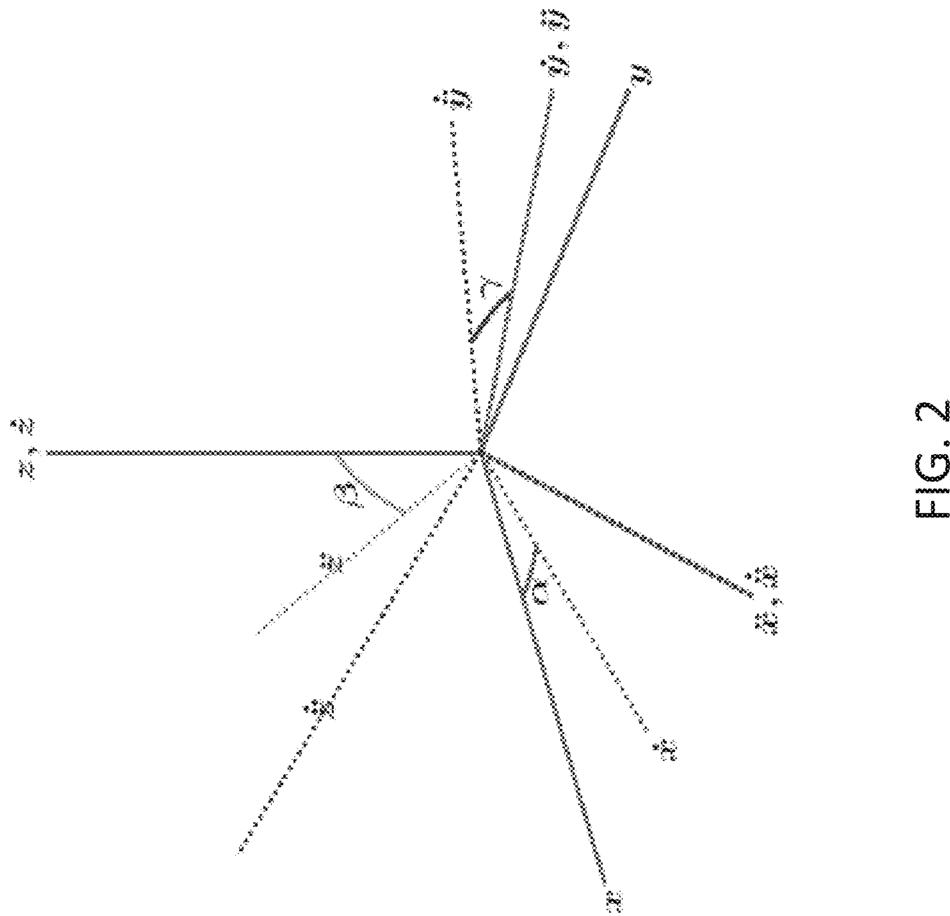
FIG. 2 is a diagram illustrating UE mechanical rotation angles defined as $\alpha$, $\beta$ and $\gamma$, according to an embodiment.

FIG. 2 is a diagram illustrating UE mechanical rotation angles defined as α, β and γ, according to an embodiment. The angle α is referred to as the yaw angle, where the x-y plane rotates around the z axis. The angle β is referred to as the roll angle, where the x-z plane rotates around the y axis. The angle γ is referred to as the pitch angle, where y-z plane rotates around x axis.

With rotation angles of (α, β, γ), the UE coordinate changes as shown in FIG. 2, and the $\theta''_{new}$ and $\varphi''_{new}$ are derived as shown in Equation (1) below.

$$\theta''_{new}(\theta'_{org}, \varphi'_{org}) = \cos^{-1}\left(\cos\beta\cos\gamma\cos\theta'_{org} + \left(\sin\beta\cos\gamma\cos(\varphi'_{org}-\alpha) - \sin\gamma\sin(\varphi'_{org}-\alpha)\right)\sin\theta'_{org}\right) \tag{1}$$

$$\varphi''_{new}(\theta'_{org}, \varphi'_{org}) = \arg\left\{\left(\cos\beta\sin\theta'_{org}\cos(\varphi'_{org}-\alpha) - \sin\beta\cos\theta'_{org}\right) + 1j\left(\cos\beta\sin\gamma\cos\theta'_{org} + \left(\sin\beta\sin\gamma\cos(\varphi'_{org}-\alpha) + \cos\gamma\sin(\varphi'_{org}-\alpha)\right)\sin\theta'_{org}\right)\right\}$$

For UE displacement, the new ZOA $\theta''_{new}$ and the new AOA $\varphi''_{new}$ may be derived considering the UE's location at the time of beam management as the reference coordinate, while the new UE position in the reference coordinate is $\vec{r}_u = (\rho'_u, \varphi'_u, \theta'_u)$. Depending on the significance of UE displacement with respect to a TX beam width, the gNB may also change the transmit beam as a result of UE displacement. One possible solution addressing such scenarios is for the UE to report the occurrence of such an event, as well as its proposed best TX beam, to the gNB, which is feasible if the UE stores all sweeping measurements from a beam management procedure, and hence holds a record of a corresponding TX beam for each new ZOA $\theta''_{new}$ and AOA $\varphi''_{new}$. It may be assumed that, if required, the gNB is able to change the Tx beam.

Figure 3:
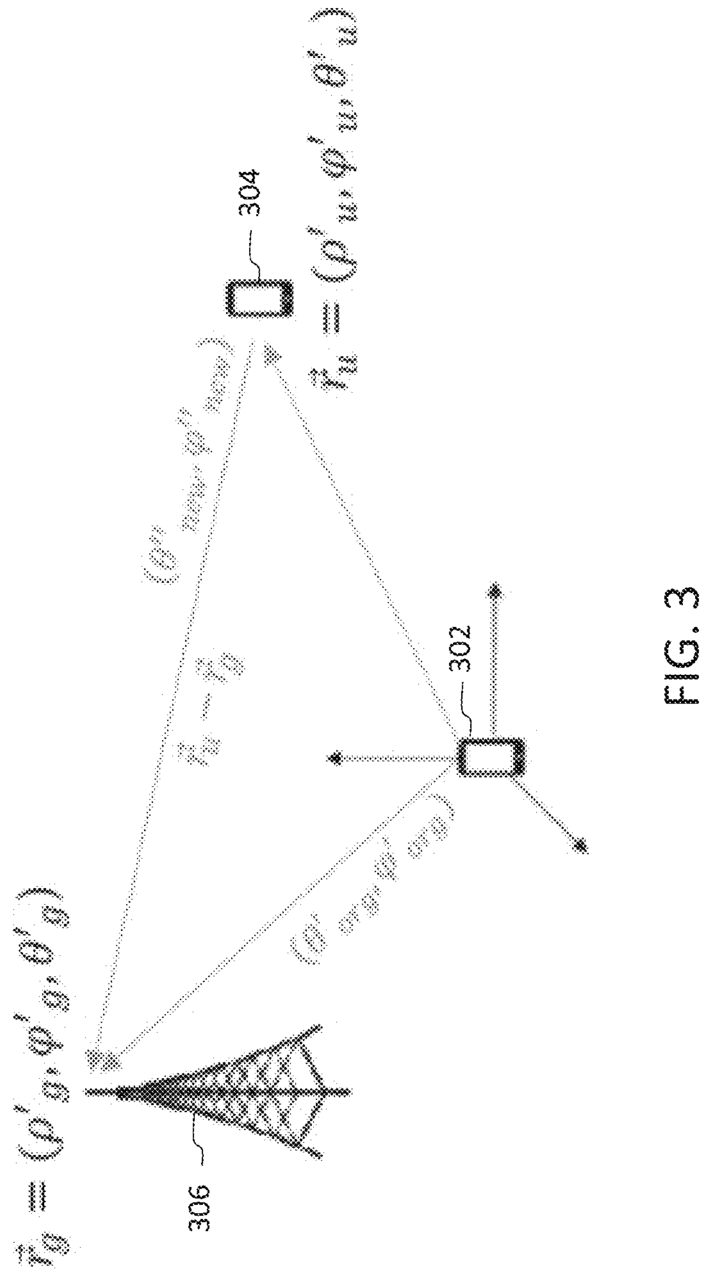
FIG. 3 is a diagram illustrating UE displacement in a line-of-sight (LOS) scenario, according to an embodiment.

FIG. 3 is a diagram illustrating UE displacement in an LOS scenario, according to an embodiment. A UE moves from a first position 302 to a second position 304 with respect to a gNB 306. The gNB position in the reference coordinate is $\vec{r}_g = (\rho'_g, \varphi'_g = \varphi'_{org}, \theta'_g = \theta'_{org})$. Given that $x_{\vec{r}_u - \vec{r}_g} = x_{\vec{r}_u} - x_{\vec{r}_g}$, $y_{\vec{r}_u - \vec{r}_g} = y_{\vec{r}_u} - y_{\vec{r}_g}$ and $z_{\vec{r}_u - \vec{r}_g} = z_{\vec{r}_u} - z_{\vec{r}_g}$ this results in Equation (2) below.

$$x_{\vec{r}_u - \vec{r}_g} = |\vec{r}_u - \vec{r}_g|\cos\varphi''_{new}\sin\theta''_{new}, \tag{2}$$

$$x_{\vec{r}_u} = \rho'_u\cos\varphi'_u\sin\theta'_u,\ x_{\vec{r}_g} = \rho'_g\cos\varphi'_{org}\sin\theta'_{org}$$

$$y_{\vec{r}_u - \vec{r}_g} = |\vec{r}_u - \vec{r}_g|\sin\varphi''_{new}\sin\theta''_{new},$$

$$y_{\vec{r}_u} = \rho'_u\sin\varphi'_u\sin\theta'_u,\ y_{\vec{r}_g} = \rho'_g\sin\varphi'_{org}\sin\theta'_{org}$$

$$z_{\vec{r}_u - \vec{r}_g} = |\vec{r}_u - \vec{r}_g|\cos\theta''_{new},\ z_{\vec{r}_u} = \rho'_u\cos\theta'_u,\ z_{\vec{r}_g} = \rho'_g\cos\theta'_{org}$$

The new angles may be derived by solving Equation (3) as Equation (4) below.

$$|\vec{r}_u - \vec{r}_g|\cos\varphi''_{new}\sin\theta''_{new} = \rho'_u\cos\varphi'_u\sin\theta'_u - \rho'_g\cos\varphi'_{org}\sin\theta'_{org} \tag{3}$$

$$y_{\vec{r}_u - \vec{r}_g} = |\vec{r}_u - \vec{r}_g|\sin\varphi''_{new}\sin\theta''_{new},\ y_{\vec{r}_u} = \rho'_u\sin\varphi'_u\sin\theta'_u,\ y_{\vec{r}_g} = \rho'_g\sin\varphi'_{org}\sin\theta'_{org}$$

$$z_{\vec{r}_u - \vec{r}_g} = |\vec{r}_u - \vec{r}_g|\cos\theta''_{new},\ z_{\vec{r}_u} = \rho'_u\cos\theta'_u,\ z_{\vec{r}_g} = \rho'_g\cos\theta'_{org}$$

$$\theta''_{new}(\theta'_{org}, \varphi'_{org}) = \cos^{-1}\frac{\rho'_u\cos\theta'_u - \rho'_g\cos\theta'_{org}}{\sqrt{\rho'^2_u + \rho'^2_g - 2\rho'_u\rho'_g\left(\cos(\theta'_u - \theta'_{org}) + \sin\theta'_u\sin\theta'_{org}\left(\cos(\varphi'_u - \varphi'_{org}) - 1\right)\right)}} \tag{4}$$

$$\varphi''_{new}(\theta'_{org}, \varphi'_{org}) = \tan^{-1}\frac{\rho'_u\sin\varphi'_u\sin\theta'_u - \rho'_g\sin\varphi'_{org}\sin\theta'_{org}}{\rho'_u\cos\varphi'_u\sin\theta'_u - \rho'_g\cos\varphi'_{org}\sin\theta'_{org}}$$

The UE may know $\rho'_g$ due to a pathloss calculation at the UE, given that the gNB transmit power is known. However, in may be assumed that $\rho' \gg \rho'_u$, and thus, Equation (4) may be simplified to $\theta''_{new} \cong \theta'_{org}$, $\varphi''_{new} \cong \varphi'_{org}$.

Figure 4:
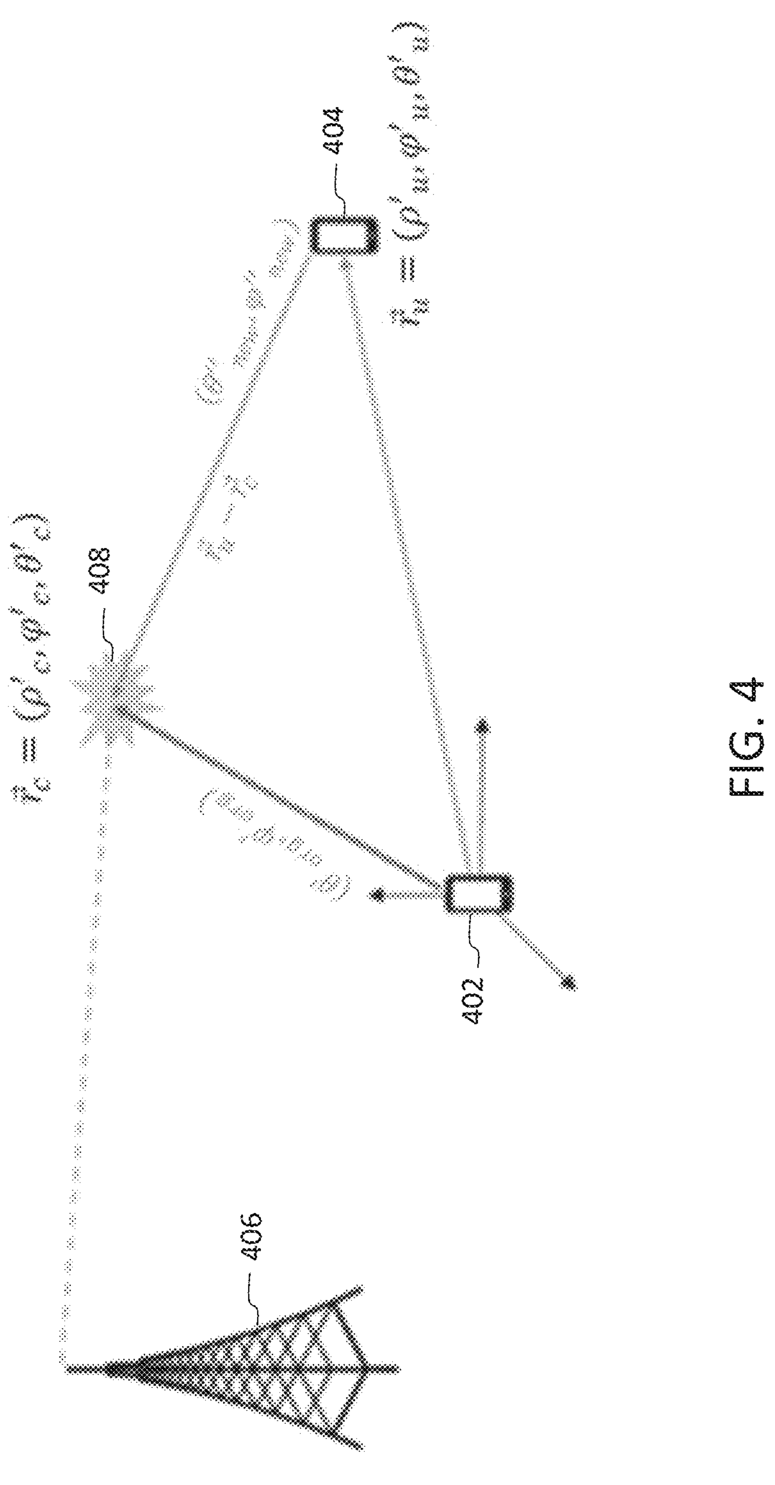
FIG. 4 is a diagram illustrating UE displacement in a non-line-of-sight (NLOS) scenario, according to an embodiment.

FIG. 4 is a diagram illustrating UE displacement in an NLOS scenario, according to an embodiment. A UE moves from a first position 402 to a second position 404 with respect to a gNB 406 An imaginary cluster 408 may be assumed at $\vec{r}_c = (\rho'_c, \varphi'_c = \varphi'_{org}, \theta'_c = \theta'_{org})$ in a coordinate that reflects the best arrival direction rays (e.g., the rays with the highest signal-to-interference and noise ratio (SINR)/RSRP measurements). The corrected arrival angle at the UE toward the imaginary cluster at $\vec{r}_c$ is derived by following the same approach as discussed for LOS scenario, as shown in Equation (5) below.

$$\theta''_{new}(\theta'_{org}, \varphi'_{org}) = \cos^{-1} \frac{\rho'_u \cos\theta'_u - \rho'_c \cos\theta'_{org}}{\sqrt{\rho'^2_u + \rho'^2_c - 2\rho'_u \rho'_c (\cos(\theta'_u - \theta'_{org}) + \sin\theta'_u \sin\theta'_{org} (\cos(\varphi'_u - \varphi'_{org}) - 1)}} \tag{5}$$

$$\varphi''_{new}(\theta'_{org}, \varphi'_{org}) = \tan^{-1} \frac{\rho'_u \sin\varphi'_u \sin\theta'_u - \rho'_c \sin\varphi'_{org} \sin\theta'_{org}}{\rho'_u \cos\varphi'_u \sin\theta'_u - \rho'_c \cos\varphi'_{org} \sin\theta'_{org}}$$

The UE may not know $\rho'_c$. However, as described above for LOS scenario, it may be assumed that for most scenarios, $\rho'_c \gg \rho'_u$, and thus, $\theta''_{new} \cong \theta'_{org}$, $\varphi''_{new} \cong \varphi'_{org}$.

UE rotation and/or displacement may affect the UE's receive beam, and accordingly, the beamforming weights do not require new sets of measurement. This is based on derived updated receive angles of ZOA $\theta''_{new}$ and AOA $\varphi''_{new}$ at the UE in its new coordinate (i.e., the UE's coordinate after rotation and/or displacement) as described above.

Figure 5:
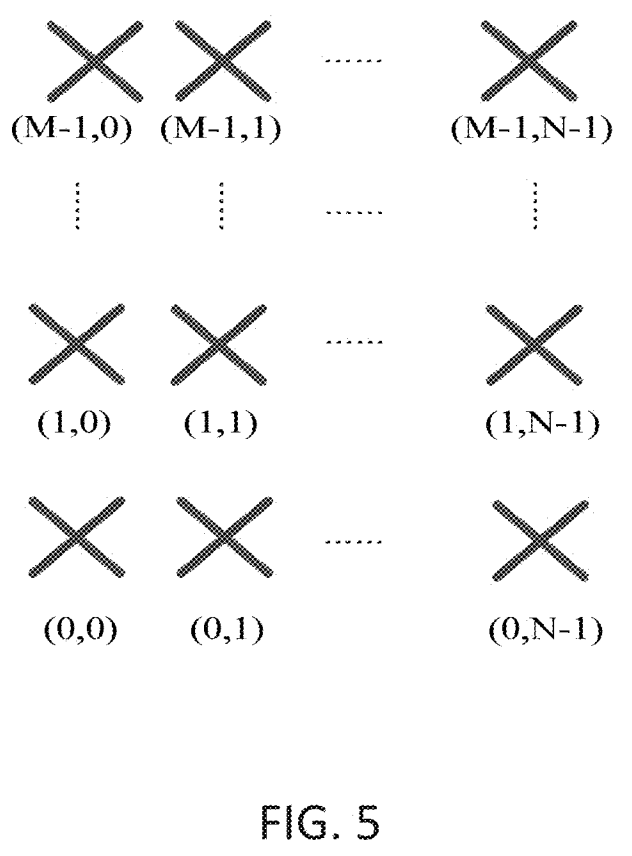

FIG. 5 is a diagram illustrating a single panel antenna array based on a 3GPP model, according to an embodiment. An antenna connection structure is provided in which each panel only supports two cross polar transceiver units (TXRUs), each connected to all antenna elements of polarization in the panel (i.e., sub-array partition structure across polarization). Antenna panels at the UE may be disposed at different locations, and not in a uniformly distributed manner, as in the 3GPP model.

For the antenna configuration of FIG. 5, the TXRU virtualization weights (i.e., hybrid beamforming weights) may be derived as Equation (6) below.

$$W_{m,n} = \exp\left(-j\frac{2\pi}{\lambda}(m-1)d_v\cos\theta\right) \times \exp\left(-j\frac{2\pi}{\lambda}(n-1)d_H\sin\varphi\right) \tag{6}$$

$$m = 1, \ldots, M,\ n = 1, \ldots, N$$

In Equation (6), $d_H$ and $d_v$ are horizontal and vertical antenna spacings in a single panel, $\lambda$ is the wavelength, $\theta$ and $\varphi$ are the zenith and azimuth beamforming angels, m and n are antenna element index in vertical and horizontal direction, M is the number of antenna elements with the same polarization in each column, and N is the number of columns.

In a scenario with no radio frequency (RF) practical limitations (e.g., infinite phase shifter granularity). Given that beam management has already identified the ZOA $\theta_{org}$ and the AOA $\varphi_{org}$ as the best reception angles at the UE in a non-rotated UE coordinate, beamforming weights are derived and applied according to Equation (7) below.

$$W^{org}_{m,n} = \exp\left(-j\frac{2\pi}{\lambda}(m-1)d_v\cos\theta'_{org}\right) \times \exp\left(-j\frac{2\pi}{\lambda}(n-1)d_H\sin\varphi'_{org}\right) \tag{7}$$

$$m = 1, \ldots, M,\ n = 1, \ldots, N$$

As the UE rotates or displaces, the UE's receive beam angles change to ZOA $\theta''_{new}$ and AOA $\varphi''_{new}$ in the new UE coordinate, as described above, to steer the UE RX beam back to the direction angles $\theta'_{org}$ and $\varphi'_{org}$ in the UE's original local coordinate. Given $\theta''_{new}$ and $\varphi''_{new}$, the virtualization (i.e., beamforming) weights may be adjusted at the UE's new coordinate so that a steering angle corresponding to the same beam direction of the original UE coordinate is ideally derived, as shown in Equation (8) below.

$$W^{new}_{m,n} = \exp\left(-j\frac{2\pi}{\lambda}(m-1)d_v\cos\theta''_{new}\right) \times \exp\left(-j\frac{2\pi}{\lambda}(n-1)d_H\sin\varphi''_{new}\right) \tag{8}$$

$$m = 1, \ldots, M,\ n = 1, \ldots, N$$

For a UE with a linear array, such as a horizontal array (i.e., M=1 in FIG. 5) and/or a vertical array (i.e., N=1 in FIG. 5), the derivation of $\theta''_{new}$ and $\varphi''_{new}$ angles would suffer from UE's ambiguity/blindness on $\theta'_{org}$ for the case of horizontal array and $\varphi'_{org}$ for the case of vertical array. In such cases, the UE may have two linear arrays in an L shape to cover both horizontal and vertical sweeping directions. Such horizontal and vertical sweepings may not happen simultaneously, as the UE may turn on each of two linear arrays in a sequential manner. In either of simultaneous and sequential sweepings, the UE may have full knowledge of both ZOA and AOA available before rotation or displacement. Alternatively, new beamforming weights may be derived assuming uniform distribution for $\theta'_{org}$ (i.e. $\theta'_{org} \sim U(0, \pi)$) and then averaging for a horizontal array, and assuming uniform distribution for $\varphi'_{org}$ (i.e. $\varphi'_{org} \sim U(-\pi, \pi)$) and then averaging for a vertical array, as shown in Equation (9) below.

$$\text{Horizontal array: } \widehat{\vartheta'^{r}}_{new} = \frac{1}{\pi}\int_0^{\pi} \theta''_{new}(\theta'_{org}, \varphi'_{org})\, d\theta'_{org}, \tag{9}$$

$$\widehat{\varphi'^{r}}_{new} = \frac{1}{\pi}\int_0^{\pi} \varphi''_{new}(\theta'_{org}, \varphi'_{org})\, d\theta'_{org}$$

$$\text{Vertical Array: } \widehat{\vartheta'^{r}}_{new} = \frac{1}{2\pi}\int_{-\pi}^{\pi} \theta''_{new}(\theta'_{org}, \varphi'_{org})\, d\varphi'_{org},$$

$$\widehat{\varphi'^{r}}_{new} = \frac{1}{2\pi}\int_{-\pi}^{\pi} \varphi''_{new}(\theta'_{org}, \varphi'_{org})\, d\varphi'_{org}$$

In Equation (9), $\theta''_{new}(\theta'_{org}, \varphi'_{org})$ and $\varphi'_{new}(\theta'_{org}, \varphi'_{org})$ are from Equation (1) for UE rotation and/or Equation (4) or (5) for UE displacement.

Further, acknowledging that the estimation variance of $\widehat{\theta'^{r}}_{new}$ and $\widehat{\varphi'^{r}}_{new}$ may be noticeable for some specific UE rotation/displacement scenarios, an addition criterion for the above-described update receive beam procedure may be provided such that for those specific scenarios, the UE would take no action to update the receive beam and keep the previous best receive beam of before rotation/displacement. For example, when a horizontal linear array along the z-axis rotates 90 degrees around the x-axis and is turned into a vertical array, additional criteria is applied such that the best beam before rotation can be kept as the updated receive beam after UE rotation.

Another approach to handle UE blindness (i.e., spatial/coverage blindness during a beam sweeping procedure) may be through an assumption of uniform distribution for a blind angle of arrival, given the knowledge of a beam radiation pattern. For example, if the exact beam radiation pattern for each beam is known, the received power for each beam may be computed for each assumed value of the blind angle. One decision rule may be based on a maximum of average of received power for each beam over all blind angle assumptions. Specifically, for each receive beam, an averaged power (over all blind angle assumptions) is calculated, and then the updated receive beam may be selected as the one with the maximum averaged power among all receive beams. Another decision rule may be based on the maximum of minimum of received power for each beam over all blind angle assumptions. Specifically, for each receive beam, the minimum received power over all blind angle assumptions is derived, and then the updated receive beam may be selected as the one that has the maximum of minimum power among all receive beams. Furthermore, some elements may be turned off to widen the beam if the blindness impact is significant for some specific cases.

The above-described beam adjustment is based on infinite phase shifter granularity (i.e., no quantization assumption). In 3GPP, beam indication is quantized and compressed in a spatial domain with an introduction of DFT beams in zenith and azimuth dimensions. An $i^{th}$ DFT beam in one dimension is defined as $$A_i^Q = \frac{\pi}{rN}\left(1 - \frac{1}{2}\right),$$

i=1, . . . rN and a $j^{th}$ DFT beam in a second dimension is $$B_j^Q = \frac{\pi}{rM}\left(j - \frac{1}{2}\right),$$

j=1, . . . , rM, where the virtualization weights are derived as Equation (10) below.

$$W_{m,n}^{DFT} = \exp\left(-j\frac{2d_v}{\lambda}(m-1)A_i^Q\right) \times \exp\left(-j\frac{2d_H}{\lambda}(n-1)B_j^Q\right) \quad (10)$$
$$m = 1, \ldots, M, n = 1, \ldots, N$$

$$A_i^Q \text{ and } B_j^Q$$

are quantized versions of $A_i=-\pi\cos(\theta)$ and $B_j=-\pi\sin(\varphi)$ according to Equations (6) and (10). With DFT beams, there may be some quantization error on beamforming weights that prevents beams before and after rotation to be aligned in the exact same direction. To illustrate, new DFT beams $$A_k^{Q,new} = \frac{\pi}{rN}\left(k - \frac{1}{2}\right) \text{ and } B_l^{Q,new} = \frac{\pi}{rM}\left(l - \frac{1}{2}\right)$$

may be selected based on a decision rule to minimize the beam distance, as shown below in Equations (11) and (12).

$$k = \min_n \left|\frac{\pi}{rN}\left(n - \frac{1}{2}\right) - A_i^{new}\right| \quad (11)$$
$$l = \min_m \left|\frac{\pi}{rM}\left(m - \frac{1}{2}\right) - B_j^{new}\right|$$
$$A_i^{new} = \pi\cos\theta''_{new} \quad (12)$$
$$B_j^{new} = \pi\sin\varphi''_{new}$$

In Equation (12), $\theta''_{new}$ and $\varphi''_{new}$ angles are derived using Equation (1) for UE rotation and/or Equation (4) or (5) for UE displacement.

In practice, a UE's codebook may be designed and kept in a form of virtualization weight vectors rather than actual DFT beams and geometrical angles. Accordingly, after beam management, the UE may only know $$W_{m,n}^{DFT,org}$$

coefficients (or possibly $$A_i^{Q,org} \text{ and } B_j^{Q,org})$$

and not $\theta'_{org}$ and $\varphi'_{org}$ angles (or $$A_i^{org} \text{ and } B_j^{org}).$$

Under such scenarios, a relationship between the new virtualization weights $$W_{m,n}^{DFT,new}$$

and virtualization weights before UE rotation $$W_{m,n}^{DFT,org}$$

would be unknown. Further, under such scenarios, some one-time initial exhaustive search may be performed offline to first establish a relationship between an angle and a RX beam by finding corresponding $$A_i^{org} \text{ and } B_j^{org}$$

of a known $$W_{m,n}^{DFT,org},$$

and then using Equations (11), (12), and (1) for UE rotation and/or Equation (4) or (5) for UE displacement, to derive $$A_i^{Q,new} \text{ and } B_j^{Q,new},$$

and consequently $$W_{m,n}^{DFT,new}$$

using Equation (10).

Some practical implementations at the UE may be based on arbitrary random beamforming weights. Under such an implementation, it may seem impossible to relate virtualization weights before and after UE rotation. All derivations above were described assuming that the best reception angles and/or beamforming weights are known at the UE after beam management, and no new RSRP/SINR measurement is required at UE. This may be possible by having all UE panels activated for beam sweeping, where UE panels are arranged to prevent allowing much of a blind sweeping spot. However, this assumption may not be realistic and the identification of a best beam after UE rotation may require new sets of measurements at the UE.

To address the UE blind spot issue described above, an alternative solution is to predict or estimate the channel after UE rotation or displacement through commonly used estimation techniques, such as, for example, maximum likelihood, minimum mean square error (MMSE), autoregressive (AR) modeling, Kalman filtering. Wiener filtering, or AI-based approaches. For example, the channel may be extrapolated based on previous channel measurements without new beam sweeping, and thus, the new best receive beam may be identified.

The UE may predict or estimate the new analog channel through a non-trivial approach based on an observation of a previous channel measurement at beam management and with knowledge of UE rotation angles. While a UE rotation scenario is described herein, all derivations are generally applicable to a UE displacement scenario assuming that the UE's displacement is considerably smaller than the UE to gNB distance (i.e., $\rho'_g \gg \rho'_u$ in LOS scenario as shown in FIG. 3, or $\rho'_c \gg \rho'_u$ in NLOS scenario as shown in FIG. 4), where Equation (4) or (5) is simplified to $\theta''_{new} \cong \theta'_{org}$, $\varphi''_{new} \cong \varphi'_{org}$. Although, such performance may not be guaranteed under UE displacement scenario. The analog channel $H_{org}(\tau, t)$ at beam management time is first obtained through comprehensive sensing channel recovery algorithm, and the new rotated analog channel $\hat{H}_{rot}(\tau, t)$ is predicted or estimated with knowledge of analog channel $H_{org}(\tau, t)$ and UE rotation angles of $(\alpha, \beta, \gamma)$. Having analog channel $\hat{H}_{rot}(\tau, t)$ estimated at the UE, the new beamforming vector $$W_{MN\times 1}^{rot}$$

may be selected from the codebook $$W_{MN\times L} = \left[W_{MN\times 1}^{(1)}, \ldots, W_{MN\times 1}^{(L)}\right]$$

based on an explicit hybrid beamforming calculation scheme according to a decision rule such as maximizing RSRP, SINR or capacity metrics. For example, following a current iterative single-connection analog beamforming (ISAB) algorithm design structure, new beamforming vector $$W_{MN\times 1}^{rot}$$

is derived by maximizing the capacity metric given the analog channel $\hat{H}_{rot}(\tau, t)$, as shown in Equation (13) below.

$$W_{MN\times 1}^{rot} = W_{MN\times 1}^{(i^*)} \text{ such that} \tag{13}$$

$$i^* = \max_{i,j} \log_2 \det\left(\sigma^2 I + \frac{\begin{bmatrix} W_{MN\times 1}^{(i)} & 0 \\ 0 & W_{MN\times 1}^{(j)} \end{bmatrix}^H \hat{H}_{rot}^H(\tau, t)\hat{H}_{rot}(\tau, t)\begin{bmatrix} W_{MN\times 1}^{(i)} & 0 \\ 0 & W_{MN\times 1}^{(j)} \end{bmatrix}}{\Gamma}\right)$$

In Equation (13), $\sigma^2$ is noise variance, $\Gamma$ is a design parameter referred to as SNR gap that can be further optimized and changed with an effective SNR, and $$W_{MN\times 1}^{(i)} \text{ and } W_{MN\times 1}^{(j)}$$

are the $i^{th}$ and $j^{th}$ beamforming weight vectors in the codebook $$W_{MN\times L} = \left[W_{MN\times 1}^{(1)}, \ldots, W_{MN\times 1}^{(L)}\right]$$

that are respectively applied to the first (i.e., horizontal) and second (i.e., vertical) polarization transmissions.

For a special case of a UE with a linear array, the analog channel recovery may suffer from UE ambiguity/blindness on one of the angle of arrivals (e.g., zenith angle for horizontal array and azimuth angle for vertical array). In such cases, a uniform distribution may be assumed for that blind-sided angle of arrival and then it may be averaged out. The averaging operation can be done at different stages of the beamforming decision metric depending on complexity and accuracy tradeoff.

The UE may predict or estimate the new rotated channel $\hat{H}_{rot}(\tau, t)$ based on an observation of previous channel measurements and with knowledge of UE rotation angle.

The geometrical channel between antenna element s at the transmitter and antenna element u at the receiver is derived as Equation (14) below.

$$H_{u,s}(\tau,t)=\sqrt{\frac{1}{K_R+1}}\,H_{u,s}^{NLOS}(\tau,t)+\sqrt{\frac{K_R}{K_R+1}}\,H_{u,s,1}^{LOS}(t)\delta(\tau-\tau_1) \tag{14}$$

In Equation (14), $K_R$ is the Ricean K-factor, $$H_{u,s}^{NLOS}(\tau,t)$$

is NLOS channel impulse response, and $$H_{u,s}^{NLOS}(\tau,t)$$

is LOS channel impulse response.

The LOS channel for antenna element s at transmitter and antenna element u at the receiver is given as Equation (15) below.

$$H_{u,s,1}^{LOS}(t)=\begin{bmatrix}F_{rx,u,\theta}(\theta_{LOS,ZOA},\varphi_{LOS,AOA})\\F_{rx,u,\varphi}(\theta_{LOS,ZOA},\varphi_{LOS,AOA})\end{bmatrix}^T\begin{bmatrix}1&0\\0&-1\end{bmatrix}\begin{bmatrix}F_{tx,s,\theta}(\theta_{LOS,ZOD},\varphi_{LOS,AOD})\\F_{tx,s,\varphi}(\theta_{LOS,ZOD},\varphi_{LOS,AOD})\end{bmatrix}e^{\frac{-j2\pi d_{3D}}{\lambda}}e^{\frac{j2\pi\hat{r}_{rx,LOS}^{T}\cdot\overline{d}_{rx,u}}{\lambda}}e^{\frac{j2\pi\hat{r}_{tx,LOS}^{T}\cdot\overline{d}_{tx,s}}{\lambda}}e^{\frac{j2\pi\hat{r}_{rx,LOS}^{T}\cdot\overline{v}}{\lambda}t} \tag{15}$$

In Equation (15), $\theta_{LOS,ZOA}$, $\varphi_{LOS,AOA}$ are zenith and azimuth angles of arrival at the receiver in global coordinate, $\theta_{LOS,ZOD}$, $\varphi_{LOS,AOD}$ are zenith and azimuth angles of departure at the transmitter in global coordinate, $F_{rx,u\theta}(\theta_{LOS,ZOA}, \varphi_{LOS,AOA})$ and $F_{rx,u\varphi}(\theta_{LOS,ZOA}, \varphi_{LOS,AOA})$ are radiation field pattern components for element u at the receiver, and $F_{tx,s\theta}(\theta_{LOS,ZOD}, \varphi_{LOS,AOD})$ and $F_{tx,s\varphi}(\theta_{LOS,ZOD}, \varphi_{LOS,AOD})$ are radiation field pattern components for element s at the transmitter in global coordinate. The radiation field pattern components are determined based on a defined radiation power pattern and 3GPP polarization modeling. The $\overline{d}_{tx,s}$ and $\overline{d}_{rx,u}$ are location vector of element s at the transmitter and element u at the receiver in global coordinate, and $\overline{v}$ is UE velocity vector in global coordinate, t represents the evolution of time, and $$\hat{r}_{tx,LOS}^{T}\text{ and }\hat{r}_{rx,LOS}^{T}$$

are the spherical unit vector at the transmitter and the receiver for the LOS ray in global coordinate, as shown below in Equation (16).

$$\hat{r}_{rx,LOS}^{T}=\begin{bmatrix}\sin\theta_{LOS,ZOA}\cos\varphi_{LOS,AOA}\\\sin\theta_{LOS,ZOA}\sin\varphi_{LOS,AOA}\\\cos\theta_{LOS,ZOA}\end{bmatrix},\quad\hat{r}_{tx,LOS}^{T}=\begin{bmatrix}\sin\theta_{LOS,ZOD}\cos\varphi_{LOS,AOD}\\\sin\theta_{LOS,ZOD}\sin\varphi_{LOS,AOD}\\\cos\theta_{LOs,ZOD}\end{bmatrix} \tag{16}$$

With n clusters and m rays per cluster, the NLOS channel for antenna element s at the transmitter and antenna element u at the receiver is derived as Equation (17) below.

$$H_{u,s}^{NLOS}(\tau,t)=\sum_{n=1}^{2}\sum_{i=1}^{3}\sum_{m\in R_i}H_{u,s,n,m}^{NLOS}(t)\delta(\tau-\tau_{n,i})+\sum_{n=3}^{N}H_{u,s,n}^{NLOS}(t)\delta(\tau-\tau_n) \tag{17}$$

In Equation (17), $R_i$, i=1, 2, 3 is the $i^{th}$ sub-cluster representing intra cluster delay spread $\tau_{n,i}$ for $n^{th}$ strongest cluster while for a weak cluster n, the delay spread of that cluster is only represented by $\tau_n$. For two strongest clusters (i.e. n=1 and n=2), Equation (18) is shown below.

$$H_{u,s,n,m}^{NLOS}(t)=\sqrt{\frac{P_n}{M}}\begin{bmatrix}F_{rx,u,\theta}(\theta_{n,m,ZOA},\varphi_{n,m,AOA})\\F_{rx,u,\varphi}(\theta_{n,m,ZOA},\varphi_{n,m,AOA})\end{bmatrix}^T\begin{bmatrix}e^{j\Phi_{n,m}^{\theta\theta}}&\sqrt{\kappa_{n,m}^{-1}}\,e^{j\Phi_{n,m}^{\theta\varphi}}\\\sqrt{\kappa_{n,m}^{-1}}\,e^{j\Phi_{n,m}^{\varphi\theta}}&e^{j\Phi_{n,m}^{\varphi\varphi}}\end{bmatrix}\times\begin{bmatrix}F_{tx,s,\theta}(\theta_{n,m,ZOD},\varphi_{n,m,AOD})\\F_{tx,s,\varphi}(\theta_{n,m,ZOD},\varphi_{n,m,AOD})\end{bmatrix}e^{\frac{j2\pi\hat{r}_{rx,n,m}^{T}\cdot\overline{d}_{rx,u}}{\lambda}}e^{\frac{j2\pi\hat{r}_{tx,n,m}^{T}\cdot\overline{d}_{tx,s}}{\lambda}}e^{\frac{j2\pi\hat{r}_{rx,n,m}^{T}\cdot\overline{v}}{\lambda}t} \tag{18}$$

For N−2 weakest clusters (i.e. n=3, . . . , N), Equation (19) is provided below.

$$H_{u,s,n}^{NLOS}(t)=\sqrt{\frac{P_n}{M}}\sum_{m=1}^{M}\begin{bmatrix}F_{rx,u,\theta}(\theta_{n,m,ZOA},\varphi_{n,m,AOA})\\F_{rx,u,\varphi}(\theta_{n,m,ZOA},\varphi_{n,m,AOA})\end{bmatrix}^T\begin{bmatrix}e^{j\Phi_{n,m}^{\theta\theta}}&\sqrt{\kappa_{n,m}^{-1}}\,e^{j\Phi_{n,m}^{\theta\varphi}}\\\sqrt{\kappa_{n,m}^{-1}}\,e^{j\Phi_{n,m}^{\varphi\theta}}&e^{j\Phi_{n,m}^{\varphi\varphi}}\end{bmatrix}\times\begin{bmatrix}F_{tx,s,\theta}(\theta_{n,m,ZOD},\varphi_{n,m,AOD})\\F_{tx,s,\varphi}(\theta_{n,m,ZOD},\varphi_{n,m,AOD})\end{bmatrix}e^{\frac{j2\pi\hat{r}_{rx,n,m}^{T}\cdot\overline{d}_{rx,u}}{\lambda}}e^{\frac{j2\pi\hat{r}_{tx,n,m}^{T}\cdot\overline{d}_{tx,s}}{\lambda}}e^{\frac{j2\pi\hat{r}_{rx,n,m}^{T}\cdot\overline{v}}{\lambda}t} \tag{19}$$

In Equation (19), $\theta_{n,m,ZOA}$, $\varphi_{n,m,AOA}$ are zenith and azimuth angles of arrival at the receiver for ray m in cluster n in global coordinate, $\theta_{n,m,ZOD}$, $\varphi_{n,m,AOD}$ are zenith and azimuth angles of departure at the transmitter for ray m in cluster n in global coordinate, $F_{rx,u,\theta}(\theta_{n,m,ZOA}, \varphi_{n,m,AOA})$ and $F_{rx,u,\varphi}(\theta_{n,m,ZOA}, \varphi_{n,m,AOA})$ are radiation field pattern components for element u at the receiver while $F_{tx,s\theta}(\theta_{n,m,ZOD}, \varphi_{n,m,AOD})$ and $F_{tx,s\varphi}(\theta_{n,m,ZOD}, \varphi_{n,m,AOD})$ are radiation field pattern components for element s at transmitter in global coordinate. The $K_{n,m}$ is cross polarization power ratio (XPR) for ray m in cluster n. The XPR, when expressed in decibels (dB), may have a nonzero-mean Gaussian distribution. From the perspective of physical propagation processes, the XPR may depend on some channel parameters, namely, the total attenuation (or equivalently, the distance between transmitter and receiver), the azimuth and elevation angles of arrival and departure as well as the delay of the multipath components. XPR may become worse by scattering, and as a result, NLOS paths may have a smaller XPR compared to LOS paths, while that does not necessarily result in an infinite XPR for LOS. In a 3GPP NR 3D channel model, however, the XPR for the LOS channel is assumed to be infinity as in Equation (15) (i.e., $\sqrt{\kappa_{LOS}^{-1}}=0$).

$$\{\Phi_{n,m}^{\theta\theta}, \Phi_{n,m}^{\theta\varphi}, \Phi_{n,m}^{\varphi\theta}, \Phi_{n,m}^{\varphi\varphi}\}$$

are initial uniformly distributed random phases for four different polarization combinations of θθ, θφ, φθ and φφ for ray m in cluster n, $\bar{d}_{tx,s}$ and $\bar{d}_{rx,u}$ are location vector of element s at the transmitter and element u at the receiver in global coordinate, and $\bar{v}$ is UE velocity vector in global coordinate, t represents the evolution of time, $$\hat{r}_{tx,n,m}^{T} \text{ and } \hat{r}_{rx,n,m}^{T}$$

are the spherical unit vector at the transmitter and the receiver for ray m in cluster n in global coordinate, as shown in Equation (20) below.

$$\hat{r}_{rx,n,m}^{T} = \begin{bmatrix} \sin\theta_{n,m,ZOA}\cos\varphi_{n,m,AOA} \\ \sin\theta_{n,m,ZOA}\sin\varphi_{n,m,AOA} \\ \cos\theta_{n,m,ZOA} \end{bmatrix}, \hat{r}_{tx,n,m}^{T} = \begin{bmatrix} \sin\theta_{n,m,ZOD}\cos\varphi_{n,m,AOD} \\ \sin\theta_{n,m,ZOD}\sin\varphi_{n,m,AOD} \\ \cos\theta_{n,m,ZOD} \end{bmatrix} \quad (20)$$

The components of electric field patterns at the transmitter and the receiver may originally be calculated in a local coordinate and then transformed to the global coordinate for derivation of channel coefficients. The field components of the radiation pattern in UE local coordinate (i.e. $F'_{rx,u,\theta}(\theta', \varphi')$, $F'_{rx,u\varphi}(\theta', \varphi')$ may be related to those in global coordinate (i.e., $F_{rx,u,\theta}(\theta, \varphi)$, $F_{rx,u,\varphi}(\theta, \varphi)$) using a rotation matrix, as shown in Equation (21) below.

$$\begin{bmatrix} F_{rx,u,\theta}(\theta, \varphi) \\ F_{rx,u,\varphi}(\theta, \varphi) \end{bmatrix} = \begin{bmatrix} \cos\psi & -\sin\psi \\ \sin\psi & \cos\psi \end{bmatrix} \begin{bmatrix} F'_{rx,u,\theta}(\theta', \varphi') \\ F'_{rx,u,\theta}(\theta', \varphi') \end{bmatrix} \quad (21)$$

In Equation (21), (θ, φ) are zenith and azimuth angles of arrival in global coordinate GSC, (θ', φ') are zenith and azimuth angles of arrival in UE's local coordinate LCS, and angle ψ can be expressed as a function of LCS angular orientation with respect to GCS (i.e. $(\Omega_\alpha, \Omega_\beta, \Omega_\gamma)$) and zenith and azimuth angles in GCS (i.e. θ and φ), and is given by Equation (22) below.

$$\psi = \arg\left\{ \begin{array}{c} \sin\Omega_\gamma\cos\theta\sin(\varphi - \Omega_\alpha) + \\ \cos\Omega_\gamma(\cos\Omega_\beta\sin\theta - \sin\Omega_\beta\cos\theta\cos(\varphi - \Omega_\alpha)) + \\ j(\sin\Omega_\gamma\cos(\varphi - \Omega_\alpha) + \sin\Omega_\beta\cos\Omega_\gamma\sin(\varphi - \Omega_\alpha)) \end{array} \right\} \quad (22)$$

Figure 6:
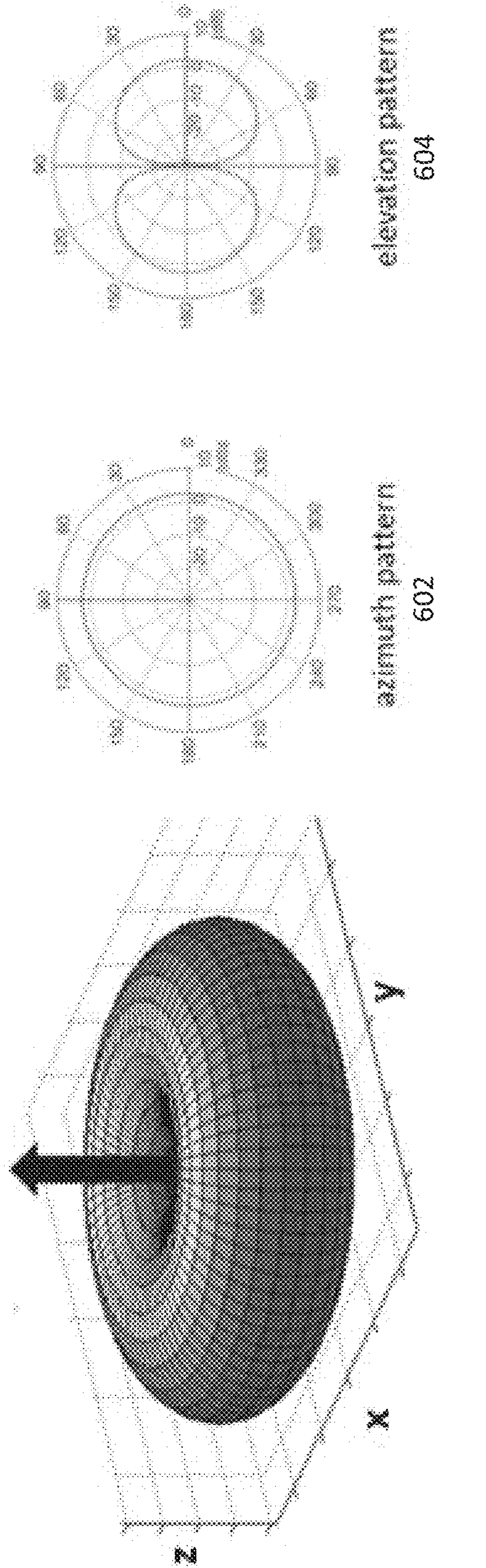
FIG. 6 is a diagram illustrating a radiation pattern of a quarter wavelength dipole antenna, according to an embodiment.

FIG. 6 is a diagram illustrating a radiation pattern of a quarter wavelength dipole antenna, according to an embodiment. An azimuth pattern 602 is omnidirectional while an elevation pattern 604 is angle dependent.

Figure 7:
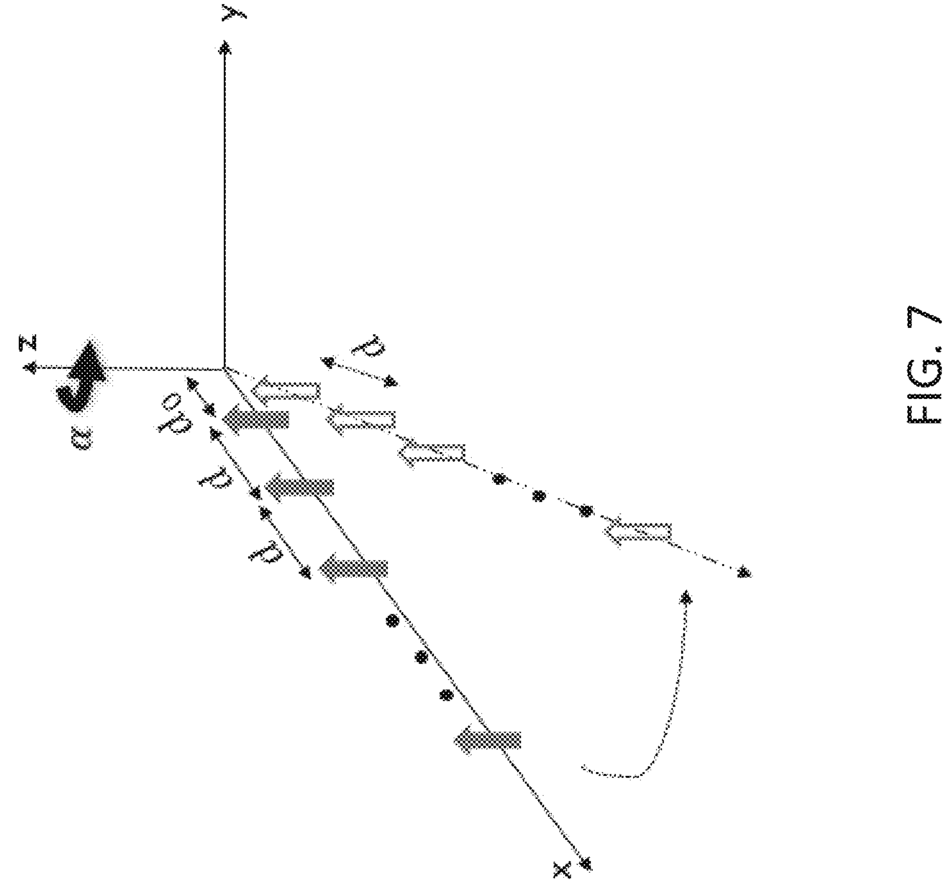
FIG. 7 is a diagram illustrating a linear array of a quarter wavelength dipole antenna along the x-axis, according to an embodiment.

FIG. 7 is a diagram illustrating a linear array of a quarter wavelength dipole antenna along the x-axis, according to an embodiment. Due to the omnidirectional shape of the dipole azimuth pattern, for any UE rotation in the azimuth (i.e., x-y) plane (i.e., a non-zero value of α while β=0 and γ=0), no change in field components of radiation pattern of any antenna element should be expected after rotation. In Equation (22), for the rotation angles of (α, β=0, γ=0), the angular displacement ψ is derived as ψ=0 for any values of θ and φ angels that would represent identity rotation matrix in Equation (21).

The UE's local coordinate at the time of beam management is $LCS_{org}$ and the UE's local coordinate after rotation is $LCS_{rot}$. Therefore, for NLOS channel element $$H_{u,s,n,m}^{NLOS}(t),$$

the original channel and rotated channel between antenna element s at the transmitter and antenna element u at the receiver for ray m in cluster n (i.e.

$$H_{org,u,s,m,n}^{NLOS}(t) \text{ and } H_{rot,u,s,m,n}^{NLOS}(t))$$

may be expressed as Equation (23) below.

$$H_{org,u,s,m,n}^{NLOS}(t) = \sqrt{\frac{P_n}{M}} \begin{bmatrix} F_{rx,u,\theta}^{org}(\theta_{n,m,ZOA}, \varphi_{n,m,AOA}) \\ F_{rx,u,\varphi}^{org}(\theta_{n,m,ZOA}, \varphi_{n,m,AOA}) \end{bmatrix}^T \begin{bmatrix} e^{j\Phi_{n,m}^{\theta\theta}} & \sqrt{\kappa_{n,m}^{-1}} e^{j\Phi_{n,m}^{\theta\varphi}} \\ \sqrt{\kappa_{n,m}^{-1}} e^{j\Phi_{n,m}^{\varphi\theta}} & e^{j\Phi_{n,m}^{\varphi\varphi}} \end{bmatrix} \times \tag{23}$$

$$\begin{bmatrix} F_{tx,s,\theta}(\theta_{n,m,ZOD}, \varphi_{n,m,AOD}) \\ F_{tx,s,\varphi}(\theta_{n,m,ZOD}, \varphi_{n,m,AOD}) \end{bmatrix} e^{\frac{j2\pi\hat{r}_{rx,n,m}^T \cdot \bar{d}_{org,rx,u}}{\lambda}} e^{\frac{j2\pi\hat{r}_{tx,n,m}^T \cdot \bar{d}_{tx,s}}{\lambda}} e^{\frac{j2\pi\hat{r}_{rx,n,m}^T \cdot \bar{v}}{\lambda} t_{org}} =$$

$$\sqrt{\frac{P_n}{M}} \begin{bmatrix} F'_{rx,u,\theta}(\theta'_{n,m,ZOA}, \varphi'_{n,m,AOA}) \\ F'_{rx,u,\varphi}(\theta'_{n,m,ZOA}, \varphi'_{n,m,AOA}) \end{bmatrix}^T \begin{bmatrix} \cos\psi_{n,m}^{org} & -\sin\psi_{n,m}^{org} \\ \sin\psi_{n,m}^{org} & \cos\psi_{n,m}^{org} \end{bmatrix}^T \begin{bmatrix} e^{j\Phi_{n,m}^{\theta\theta}} & \sqrt{\kappa_{n,m}^{-1}} e^{j\Phi_{n,m}^{\theta\varphi}} \\ \sqrt{\kappa_{n,m}^{-1}} e^{j\Phi_{n,m}^{\varphi\theta}} & e^{j\Phi_{n,m}^{\varphi\varphi}} \end{bmatrix} \times$$

$$\begin{bmatrix} F_{tx,s,\theta}(\theta_{n,m,ZOD}, \varphi_{n,m,AOD}) \\ F_{tx,s,\varphi}(\theta_{n,m,ZOD}, \varphi_{n,m,AOD}) \end{bmatrix} e^{\frac{j2\pi\hat{r}_{rx,n,m}^T \cdot \bar{d}_{org,rx,u}}{\lambda}} e^{\frac{j2\pi\hat{r}_{tx,n,m}^T \cdot \bar{d}_{tx,s}}{\lambda}} e^{\frac{j2\pi\hat{r}_{rx,n,m}^T \cdot \bar{v}}{\lambda} t_{org}}$$

$$H_{rot,u,s,m,n}^{NLOS}(t) = \sqrt{\frac{P_n}{M}} \begin{bmatrix} F_{rx,u,\theta}^{rot}(\theta_{n,m,ZOA}, \varphi_{n,m,AOA}) \\ F_{rx,u,\varphi}^{rot}(\theta_{n,m,ZOA}, \varphi_{n,m,AOA}) \end{bmatrix}^T \begin{bmatrix} e^{j\Phi_{n,m}^{\theta\theta}} & \sqrt{\kappa_{n,m}^{-1}} e^{j\Phi_{n,m}^{\theta\varphi}} \\ \sqrt{\kappa_{n,m}^{-1}} e^{j\Phi_{n,m}^{\varphi\theta}} & e^{j\Phi_{n,m}^{\varphi\varphi}} \end{bmatrix} \times$$

$$\begin{bmatrix} F_{tx,s,\theta}(\theta_{n,m,ZOD}, \varphi_{n,m,AOD}) \\ F_{tx,s,\varphi}(\theta_{n,m,ZOD}, \varphi_{n,m,AOD}) \end{bmatrix} e^{\frac{j2\pi\hat{r}_{rx,n,m}^T \cdot \bar{d}_{rot,rx,u}}{\lambda}} e^{\frac{j2\pi\hat{r}_{tx,n,m}^T \cdot \bar{d}_{tx,s}}{\lambda}} e^{\frac{j2\pi\hat{r}_{rx,n,m}^T \cdot \bar{v}}{\lambda} t_{rot}} =$$

$$\sqrt{\frac{P_n}{M}} \begin{bmatrix} F''_{rx,u,\theta}(\theta''_{n,m,ZOA}, \varphi''_{n,m,AOA}) \\ F''_{rx,u,\varphi}(\theta''_{n,m,ZOA}, \varphi''_{n,m,AOA}) \end{bmatrix}^T \begin{bmatrix} \cos\psi_{n,m}^{rot} & -\sin\psi_{n,m}^{rot} \\ \sin\psi_{n,m}^{rot} & \cos\psi_{n,m}^{rot} \end{bmatrix}^T \begin{bmatrix} e^{j\Phi_{n,m}^{\theta\theta}} & \sqrt{\kappa_{n,m}^{-1}} e^{j\Phi_{n,m}^{\theta\varphi}} \\ \sqrt{\kappa_{n,m}^{-1}} e^{j\Phi_{n,m}^{\varphi\theta}} & e^{j\Phi_{n,m}^{\varphi\varphi}} \end{bmatrix}$$

$$\begin{bmatrix} F_{tx,s,\theta}(\theta_{n,m,ZOD}, \varphi_{n,m,AOD}) \\ F_{tx,s,\varphi}(\theta_{n,m,ZOD}, \varphi_{n,m,AOD}) \end{bmatrix} e^{\frac{j2\pi\hat{r}_{rx,n,m}^T \cdot \bar{d}_{rot,rx,u}}{\lambda}} e^{\frac{j2\pi\hat{r}_{tx,n,m}^T \cdot \bar{d}_{tx,s}}{\lambda}} e^{\frac{j2\pi\hat{r}_{rx,n,m}^T \cdot \bar{v}}{\lambda} t_{rot}} \times$$

$$\begin{bmatrix} F_{tx,s,\theta}(\theta_{n,m,ZOD}, \varphi_{n,m,AOD}) \\ F_{tx,s,\varphi}(\theta_{n,m,ZOD}, \varphi_{n,m,AOD}) \end{bmatrix} e^{\frac{j2\pi\hat{r}_{rx,n,m}^T \cdot \bar{d}_{rot,rx,u}}{\lambda}} e^{\frac{j2\pi\hat{r}_{tx,n,m}^T \cdot \bar{d}_{tx,s}}{\lambda}} e^{\frac{j2\pi\hat{r}_{rx,n,m}^T \cdot \bar{v}}{\lambda} t_{rot}} \times$$

$$\begin{bmatrix} F_{tx,s,\theta}(\theta_{n,m,ZOD}, \varphi_{n,m,AOD}) \\ F_{tx,s,\varphi}(\theta_{n,m,ZOD}, \varphi_{n,m,AOD}) \end{bmatrix} e^{\frac{j2\pi\hat{r}_{rx,n,m}^T \cdot \bar{d}_{rot,rx,u}}{\lambda}} e^{\frac{j2\pi\hat{r}_{tx,n,m}^T \cdot \bar{d}_{tx,s}}{\lambda}} e^{\frac{j2\pi\hat{r}_{rx,n,m}^T \cdot \bar{v}}{\lambda} t_{rot}} \times$$

$$\begin{bmatrix} F_{tx,s,\theta}(\theta_{n,m,ZOD}, \varphi_{n,m,AOD}) \\ F_{tx,s,\varphi}(\theta_{n,m,ZOD}, \varphi_{n,m,AOD}) \end{bmatrix} e^{\frac{j2\pi\hat{r}_{rx,n,m}^T \cdot \bar{d}_{rot,rx,u}}{\lambda}} e^{\frac{j2\pi\hat{r}_{tx,n,m}^T \cdot \bar{d}_{tx,s}}{\lambda}} e^{\frac{j2\pi\hat{r}_{rx,n,m}^T \cdot \bar{v}}{\lambda} t_{rot}}$$

In Equation (23), $(\theta'_{n,m,ZOA}, \varphi'_{n,m,AOA})$ and $(\theta''_{n,m,ZOA}, \varphi''_{n,m,AOA})$ are zenith and azimuth angles of arrival at the receiver for ray m in cluster n in $LCS_{org}$ and $LCS_{rot}$ respectively, $F'_{rx,u\theta}(\theta'_{n,m,ZOA}, \varphi'_{n,m,AOA})$ and $F'_{rx,u\varphi}(\theta'_{n,m,ZOA}, \varphi'_{n,m,AOA})$ are radiation field pattern components for element u at the receiver in $LCS_{org}$, $F''_{rx,u,\theta}(\theta''_{n,m,ZOA}, \varphi''_{n,m,AOA})$ and $F''_{rx,u,\theta}(\theta''_{n,m,ZOA}, \varphi''_{n,m,AOA})$ are radiation field pattern components for element u at the receiver in $LCS_{rot}$. $F'_{rx,u,\theta}(\theta, \varphi)=F''_{rx,u,\theta}(\theta, \varphi)$, $F'_{rx,u\varphi}(\theta, \varphi)=F''_{rx,u\theta}(\theta, \varphi)$ for all values of $\theta$, $\varphi$. $F^{org}_{rx,u,\theta}(\theta_{n,m,ZOA}, \varphi_{n,m,AOA})$ and $F^{org}_{rx,u,\theta}(\theta_{n,m,ZOA}, \varphi_{n,m,AOA})$ are radiation field pattern components for element u at the receiver in GCS before rotation, and $F^{rot}_{rx,u,\theta}(\theta_{n,m,ZOA}, \varphi_{n,m,AOA})$ and $F^{rot}_{rx,u,\varphi}(\theta_{n,m,ZOA}, \varphi_{n,m,AOA})$ are radiation field pattern components for element u at the receiver in GCS after rotation. Transition angles $$\psi_{n,m}^{org} \text{ and } \psi_{n,m}^{rot}$$

are calculated using Equation (22) with LCS angular orientation of $$(\Omega_\alpha^{org}, \Omega_\beta^{org}, \Omega_\gamma^{org}) \text{ and } (\Omega_\alpha^{rot}, \Omega_\beta^{rot}, \Omega_\gamma^{rot})$$

respectively for $LCS_{org}$ and $LCS_{rot}$ with respect to GCS. $\bar{d}_{org,rx,u}$ and $\bar{d}_{rot,rx,u}$ are location vector of element u at the receiver in GCS at times of $t_{org}$ (i.e., time of beam management) and $t_{rot}$ (i.e., time after rotation), respectively.

Comparing the equations of the original and rotated channels for ray m in cluster n (i.e., $$H_{org,u,s,m,n}^{NLOS}(t) \text{ and } H_{rot,u,s,m,n}^{NLOS}(t))$$

in Equation (23), there may be some parts of the channel that are common before and after rotation, and for all receiver antenna elements, a 2×1 vector defined in GCS is shown in Equation (24) below.

$$\Lambda_{m,n} = \begin{bmatrix} e^{j\Phi_{n,m}^{\theta\theta}} & \sqrt{\kappa_{n,m}^{-1}} e^{j\Phi_{n,m}^{\theta\varphi}} \\ \sqrt{\kappa_{n,m}^{-1}} e^{j\Phi_{n,m}^{\varphi\theta}} & e^{j\Phi_{n,m}^{\varphi\varphi}} \end{bmatrix} \begin{bmatrix} F_{tx,s,\theta}(\theta_{n,m,ZOD}, \varphi_{n,m,AOD}) \\ F_{tx,s,\varphi}(\theta_{n,m,ZOD}, \varphi_{n,m,AOD}) \end{bmatrix} e^{\frac{j2\pi\hat{r}_{tx,n,m}^T \cdot \bar{d}_{tx,s}}{\lambda}} \tag{24}$$

The common vector $\Lambda_{m,n}$ is unknown to the UE, and the remaining parts of the channel are assumed to be known information or may be calculated at the UE. For example, it may be assumed that the known or calculated information includes $(\theta'_{n,m,ZOA}, \varphi'_{n,m,AOA})$. $(\theta''_{n,m,ZOA},$ $$\psi^{org}_{n,m},\ \psi^{rot}_{n,m}$$

and also $e^{j\Gamma_{n,m}}$, where $$\Gamma_{n,m} = \frac{2\pi}{\lambda}\hat{r}^{T}_{rx,n,m}\cdot(\bar{d}_{rot,rx,u} - \bar{d}_{org,rx,u} + \bar{v}(t_{rot} - t_{org})).$$

If radiation field pattern components F' and F'' are assumed to be known, unknown $\Lambda_{m,n}$ may be solved for by using two channel observations $$H^{NLOS}_{org,u,s,m,n}(t),\ H^{NLOS}_{org,u',s,m,n}(t)$$

at two different receive antenna elements u and u' before rotation, and this may be used to compute the channel after rotation.

The above-described procedure may be applied with any pair of receive antenna elements, but an alternative can be considered which may be useful when antenna polarization Model-2 can be assumed. To do so, the original and rotated channels are expressed for cross polar transmission between antenna element s at the transmitter and antenna elements u, u' at the receiver, where antenna element u correspond to first polarization (e.g., horizontal) and antenna element u' correspond to the second polarization (e.g., vertical), as shown in Equation (25) below.

$$H^{NLOS}_{org,n,m}(t) = \begin{bmatrix} H^{NLOS}_{org,u,s,n,m}(t) \\ H^{NLOS}_{org,u\prime,s,n,m}(t) \end{bmatrix} \tag{25}$$

$$H^{NLOS}_{rot,n,m}(t) = \begin{bmatrix} H^{NLOS}_{rot,u,s,n,m}(t) \\ H^{NLOS}_{rot,u\prime,s,n,m}(t) \end{bmatrix}$$

With a single polarized transmission, due to possible misalignment of transmit and receive antennas, the measured power at the receive antenna element may be affected by polarization loss factor. To address this, with cross polarized receive antennas, the sum power of these two receive antenna elements may become independent of the receive antenna slant angle, and hence, combined cross polarized radiation power pattern may not have dependency on antenna misalignment. However, expressing the original and rotated channels for cross polar transmission, as in Equation (25), also guarantees no polarization loss factor on an antenna radiation power pattern.

The channel coefficients $$H^{NLOS}_{org,u,s,m,n}(t) \text{ and } H^{NLOS}_{rot,u,s,m,n}(t)$$

can be rewritten as shown in Equation (26) below.

$$H^{NLOS}_{org,m,n}(t) = \sqrt{\frac{P_n}{M}}\begin{bmatrix} F'_{rx,u,\theta}(\theta'_{n,m,ZOA}, \varphi'_{n,m,AOA}) & F'_{rx,u\prime,\theta}(\theta'_{n,m,ZOA}, \varphi'_{n,m,AOA}) \\ F'_{rx,u,\varphi}(\theta'_{n,m,ZOA}, \varphi'_{n,m,AOA}) & F'_{rx,u',\varphi}(\theta'_{n,m,ZOA}, \varphi'_{n,m,AOA}) \end{bmatrix}^{T} \begin{bmatrix} \cos\psi^{org}_{n,m} & -\sin\psi^{org}_{n,m} \\ \sin\psi^{org}_{n,m} & \cos\psi^{org}_{n,m} \end{bmatrix}^{T} e^{\frac{j2\pi\hat{r}^{T}_{rx,n,m}\cdot\bar{d}_{org,rx,u}}{\lambda}} e^{\frac{j2\pi\hat{r}^{T}_{rx,n,m}\cdot\bar{v}}{\lambda}t_{org}} \Lambda_{m,n} \tag{26}$$

$$H^{NLOS}_{rot,m,n}(t) = \sqrt{\frac{P_n}{M}}\begin{bmatrix} F'_{rx,u,\theta}(\theta'_{n,m,ZOA}, \varphi'_{n,m,AOA}) & F'_{rx,u\prime,\theta}(\theta'_{n,m,ZOA}, \varphi'_{n,m,AOA}) \\ F'_{rx,u,\varphi}(\theta'_{n,m,ZOA}, \varphi'_{n,m,AOA}) & F'_{rx,u',\varphi}(\theta'_{n,m,ZOA}, \varphi'_{n,m,AOA}) \end{bmatrix}^{T} \begin{bmatrix} \cos\psi^{org}_{n,m} & -\sin\psi^{org}_{n,m} \\ \sin\psi^{org}_{n,m} & \cos\psi^{org}_{n,m} \end{bmatrix}^{T} e^{\frac{j2\pi\hat{r}^{T}_{rx,n,m}\cdot\bar{d}_{org,rx,u}}{\lambda}} e^{\frac{j2\pi\hat{r}^{T}_{rx,n,m}\cdot\bar{v}}{\lambda}t_{org}} \Lambda_{m,n}$$

$$H^{NLOS}_{rot,m,n}(t) = \sqrt{\frac{P_n}{M}}\begin{bmatrix} F''_{rx,u,\theta}(\theta''_{n,m,ZOA}, \varphi''_{n,m,AOA}) & F''_{rx,u\prime,\theta}(\theta''_{n,m,ZOA}, \varphi''_{n,m,AOA}) \\ F''_{rx,u,\varphi}(\theta''_{n,m,ZOA}, \varphi''_{n,m,AOA}) & F''_{rx,u',\varphi}(\theta''_{n,m,ZOA}, \varphi''_{n,m,AOA}) \end{bmatrix}^{T} \begin{bmatrix} \cos\psi^{rot}_{n,m} & -\sin\psi^{rot}_{n,m} \\ \sin\psi^{rot}_{n,m} & \cos\psi^{rot}_{n,m} \end{bmatrix}^{T} e^{\frac{j2\pi\hat{r}^{T}_{rx,n,m}\cdot\bar{d}_{rot,rx,u}}{\lambda}} e^{\frac{j2\pi\hat{r}^{T}_{rx,n,m}\cdot\bar{v}}{\lambda}t_{rot}} \Lambda_{m,n}$$

The sets of Equation (26) may be solved for the relationship between original and rotated channels for ray m in cluster n derived as Equation (27) below.

$$H^{NLOS}_{rot,n,m}(t) = \begin{bmatrix} F''_{rx,u,\theta}(\theta''_{n,m,ZOA}, \varphi''_{n,m,AOA}) & F''_{rx,u,\varphi}(\theta''_{n,m,ZOA}, \varphi''_{n,m,AOA}) \\ F''_{rx,u',\theta}(\theta''_{n,m,ZOA}, \varphi''_{n,m,AOA}) & F''_{rx,u',\varphi}(\theta''_{n,m,ZOA}, \varphi''_{n,m,AOA}) \end{bmatrix} \begin{bmatrix} \cos\psi_{n,m} & -\sin\psi_{n,m} \\ \sin\psi_{n,m} & \cos\psi_{n,m} \end{bmatrix} \times \left(\begin{bmatrix} F'_{rx,u,\theta}(\theta'_{n,m,ZOA}, \varphi'_{n,m,AOA}) & F'_{rx,u,\varphi}(\theta'_{n,m,ZOA}, \varphi'_{n,m,AOA}) \\ F'_{rx,u',\theta}(\theta'_{n,m,ZOA}, \varphi'_{n,m,AOA}) & F'_{rx,u',\varphi}(\theta'_{n,m,ZOA}, \varphi'_{n,m,AOA}) \end{bmatrix}\right)^{-1} e^{j\Gamma_{n,m}} H^{NLOS}_{org,n,m}(t) = F_{n,m} e^{j\Gamma_{n,m}} H^{NLOS}_{org,n,m}(t) \tag{27}$$

In Equation (27), $$\psi_{n,m} = \psi_{n,m}^{rot} - \psi_{n,m}^{org},$$

$$\Gamma_{n,m} = \frac{2\pi}{\lambda}\hat{r}_{rx,n,m}^{T} \cdot (\bar{d}_{rot,rx,u} - \bar{d}_{org,rx,u} + \bar{v}(t_{rot} - t_{org}))$$

is the phase difference due to antenna element displacement and receiver mobility. The UE velocity is known through UE motion sensors with an acceptable accuracy, and hence, the phase difference due to UE mobility can be ignored such that for the rest of this study we simply consider $$\Gamma_{n,m} = \frac{2\pi}{\lambda}\hat{r}_{rx,n,m}^{T} \cdot (\bar{d}_{rot,rx,u} - \bar{d}_{org,rx,u}).$$

The relationship between $\bar{d}_{org,rx,u}$ and $\bar{d}_{rot,rx,u}$ can be derived using the global coordinate as a reference coordinate, as shown in Equation (28) below.

$$\bar{d}_{rot,rx,u} = R_{rot}R_{org}^{-1}\bar{d}_{org,rx,u} = R\bar{d}_{org,rx,u} \text{ with} \tag{28}$$

$$R_{org} = \begin{bmatrix} \cos\Omega_\alpha^{org}\cos\Omega_\beta^{org} & \cos\Omega_\alpha^{org}\sin\Omega_\beta^{org}\sin\Omega_\gamma^{org} - \sin\Omega_\alpha^{org}\cos\Omega_\gamma^{org} & \cos\Omega_\alpha^{org}\sin\Omega_\beta^{org}\cos\Omega_\gamma^{org} + \sin\Omega_\alpha^{org}\sin\Omega_\gamma^{org} \\ \sin\Omega_\alpha^{org}\cos\Omega_\beta^{org} & \cos\Omega_\alpha^{org}\sin\Omega_\beta^{org}\sin\Omega_\gamma^{org} + \sin\Omega_\alpha^{org}\cos\Omega_\gamma^{org} & \sin\Omega_\alpha^{org}\sin\Omega_\beta^{org}\cos\Omega_\gamma^{org} - \cos\Omega_\alpha^{org}\sin\Omega_\gamma^{org} \\ -\sin\Omega_\beta^{org} & \cos\Omega_\alpha^{org}\sin\Omega_\gamma^{org} & \cos\Omega_\beta^{org}\cos\Omega_\gamma^{org} \end{bmatrix}$$

$$R_{rot} = \begin{bmatrix} \cos\Omega_\alpha^{rot}\cos\Omega_\beta^{rot} & \cos\Omega_\alpha^{rot}\sin\Omega_\beta^{rot}\sin\Omega_\gamma^{rot} - \sin\Omega_\alpha^{rot}\cos\Omega_\gamma^{rot} & \cos\Omega_\alpha^{rot}\sin\Omega_\beta^{rot}\cos\Omega_\gamma^{rot} + \sin\Omega_\alpha^{rot}\sin\Omega_\gamma^{rot} \\ \sin\Omega_\alpha^{rot}\cos\Omega_\beta^{rot} & \cos\Omega_\alpha^{rot}\sin\Omega_\beta^{rot}\sin\Omega_\gamma^{rot} + \sin\Omega_\alpha^{rot}\cos\Omega_\gamma^{rot} & \sin\Omega_\alpha^{rot}\sin\Omega_\beta^{rot}\cos\Omega_\gamma^{rot} - \cos\Omega_\alpha^{rot}\sin\Omega_\gamma^{rot} \\ -\sin\Omega_\beta^{rot} & \cos\Omega_\alpha^{rot}\sin\Omega_\gamma^{rot} & \cos\Omega_\beta^{rot}\cos\Omega_\gamma^{rot} \end{bmatrix}$$

$$R = \begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \cos\alpha\sin\beta\sin\gamma + \sin\alpha\cos\gamma & \sin\alpha\sin\beta\cos\gamma - \cos\alpha\sin\gamma \\ -\sin\beta & \cos\alpha\sin\gamma & \cos\beta\cos\gamma \end{bmatrix}$$

In Equation (28), $R_{org}$ and $R_{rot}$ are the composite rotation matrix in $LCS_{org}$ and $LCS_{rot}$, respectively, with respect to global coordinate GCS, while $$(\Omega_\alpha^{org}, \Omega_\beta^{org}, \Omega_\gamma^{org}) \text{ and } (\Omega_\alpha^{rot}, \Omega_\beta^{rot}, \Omega_\gamma^{rot})$$

are angular orientation of $LCS_{org}$ and $LCS_{rot}$ with respect to GCS, respectively. R is the composite rotation matrix in $LCS_{rot}$ with respect to $LCS_{org}$ with $$(\alpha, \beta, \gamma) = (\Omega_\alpha^{rot} - \Omega_\alpha^{org}, \Omega_\beta^{rot} - \Omega_\beta^{otg}, \Omega_\gamma^{rot} - \Omega_\gamma^{org}).$$

Therefore, $\Gamma_{n,m}$ in Equation (27) is simplified as $$\Gamma_{n,m} = \frac{2\pi}{\lambda}\hat{r}_{rx,n,m}^{T} \cdot (R - I_{3\times 3})\bar{d}_{org,rx,u}$$

where $I_{3\times3}$ is an identity matrix. To better illustrate such a phase difference due to antenna element displacement, for the linear antenna array shown in FIG. 7, the location vector of antenna element u is $\bar{d}_{org,u}=[ud+d_0\ 0\ 0]^T$ and with a UE rotation in azimuth plane (i.e. $\alpha\neq0$, $\beta=0$, $\gamma=0$), it is expected that the incident angle of any channel ray would change except when the ray is on the z-axis (i.e., perpendicular to the azimuth plane). This is acknowledged by the fact that the x and y components of location vector of all antenna elements change after such UE rotation according to Equation (28), where for the rotation angles of ($\alpha$, $\beta=0$, $\gamma=0$), the composite rotation matrix is simplified as $$R = \begin{bmatrix} \cos\alpha & -\sin\alpha & 0 \\ \sin\alpha & \sin\alpha & 0 \\ 0 & 0 & 1 \end{bmatrix}$$

that results in $\bar{d}_{rot,u}=[(ud+d_0)\cos\alpha\ (ud+d_0)\sin\alpha\ 0]^T$.

The rotated cross polar channel $H_{rot}(\tau, t)$ may be derived in general form as shown in Equations (29) and (30) below.

$$H_{rot}(\tau, t) = \sqrt{\frac{1}{K_R+1}}\left(\begin{matrix}\sum_{n=1}^{2}\sum_{i=1}^{3}\sum_{m\in R_i} F_{n,m}e^{j\Gamma_{n,m}}H_{org,n,m}^{NLOS}(t)\delta(\tau-\tau_{n,i}) + \\ \sum_{n=3}^{N} F_n e^{j\Gamma_n}H_{org,n}^{NLOS}(t)\delta(\tau-\tau_n)\end{matrix}\right) + \sqrt{\frac{K_R}{K_R+1}}F_{LOS}e^{j\Gamma_{LOS}}H_{org}^{LOS}(t)\delta(\tau-\tau_1) \tag{29}$$

$$\text{where } H_{rot}(\tau, t) = \begin{bmatrix} H_{rot,u,s}(\tau, t) \\ H_{rot,u\prime,s}(\tau, t) \end{bmatrix} \tag{30}$$

$$H_{org,n,m}^{NLOS}(t) = \begin{bmatrix} H_{org,u,s,n,m}^{NLOS}(t) \\ H_{org,u\prime,s,n,m}^{NLOS}(t) \end{bmatrix}, H_{org,n}^{NLOS}(t) = \begin{bmatrix} H_{org,u,s,n}^{NLOS}(t) \\ H_{org,u\prime,s,n}^{NLOS}(t) \end{bmatrix},$$

$$H_{org}^{LOS}(t) = \begin{bmatrix} H_{org,u,s,1}^{LOS}(t) \\ H_{org,u\prime,s,1}^{LOS}(t) \end{bmatrix}$$

The derivation of Equation (29) is based on an assumption of a slow fading where the geometrical channel does not change significantly over time (other than UE rotation). Furthermore, for each ray (e.g., ray m in each cluster n), there is a specific angular displacement (i.e., $\psi_{n,m}$) and phase variation (i.e., $\Gamma_{n,m}$) as AOA (i.e., $\varphi_{n,m,AOA}$) and ZOA (i.e., $\theta_{n,m,ZOA}$) of each ray are different. For channels such as CDL type D and CDL type E, due to a dominant LOS path, it may be assumed that a single angular displacement (e.g., $\Omega_{LOS}$) and phase variation (e.g., $\Gamma_{LOS}$) corresponding to ZOA and AOA of the LOS path, and the rotated channel $H_{rot}(\tau, t)$ may be derived as shown in Equation (29) with only knowledge of one set of ZOA and AOA angles. However, in general and specifically for channels with CDL type A, CDL type B, and CDL type C, knowledge of AOA and ZOA angles for different rays or at least for clusters may be needed to derive rotated channel $\hat{H}_{rot}(\tau, t)$ from an observation of an original channel.

A mathematical derivation of $F_{n,m}$ may be provided under an angle independent model, the end result of which is simplified as Equation (31) below.

$$F_{n,m} = \begin{bmatrix} F''_{rx,u,\theta}(\theta''_{n,m,ZOA}, \varphi''_{n,m,AOA}) & F''_{rx,u,\varphi}(\theta''_{n,m,ZOA}, \varphi''_{n,m,AOA}) \\ F''_{rx,u',\theta}(\theta''_{n,m,ZOA}, \varphi''_{n,m,AOA}) & F''_{rx,u',\varphi}(\theta''_{n,m,ZOA}, \varphi''_{n,m,AOA}) \end{bmatrix} \begin{bmatrix} \cos\psi_{n,m} & -\sin\psi_{n,m} \\ \sin\psi_{n,m} & \cos\psi_{n,m} \end{bmatrix} \times \begin{bmatrix} F'_{rx,u,\theta}(\theta'_{n,m,ZOA}, \varphi'_{n,m,AOA}) & F'_{rx,u,\varphi}(\theta'_{n,m,ZOA}, \varphi'_{n,m,AOA}) \\ F'_{rx,u',\theta}(\theta'_{n,m,ZOA}, \varphi'_{n,m,AOA}) & F'_{rx,u',\varphi}(\theta'_{n,m,ZOA}, \varphi'_{n,m,AOA}) \end{bmatrix}^{-1} = AR_{n,m} \begin{bmatrix} \cos\psi_{n,m} & -\sin\psi_{n,m} \\ \sin\psi_{n,m} & \cos\psi_{n,m} \end{bmatrix} \quad (31)$$

In Equation (31), $AR_{n,m}$ is the ratio of 3D power pattern of an antenna element at arrival angles of ray m in cluster n in $LCS_{rot}$ (i.e., $\theta''_{n,m,ZOA}$ and $\varphi''_{n,m,AOA}$ to 3D power pattern of an antenna element at arrival angles $\theta'_{n,m,ZOA}$ and $\varphi'_{n,m,AOA}$ in $LCS_{org}$. For a special case of angle independency of the antenna power pattern (i.e., $A'(\theta', \varphi')=A''(\theta'', \varphi'')$), channel update after rotation does not require knowledge of an antenna radiation pattern or field components F' and F".

The relationship between original and rotated channels for ray m in cluster n is derived as shown in Equation (32) below.

$$H^{NLOS}_{rot,n,m}(t) = AR_{n,m} \begin{bmatrix} \cos\psi_{n,m} & -\sin\psi_{n,m} \\ \sin\psi_{n,m} & \cos\psi_{n,m} \end{bmatrix} e^{j\Gamma_{n,m}} H^{NLOS}_{org,n,m}(t) \quad (32)$$

For a simple scenario where the CDL channel has only a single ray, Equation (33) is provided below.

$$H^{NLOS}_{rot}(\tau, t) = e^{j\Gamma} AR \begin{bmatrix} \cos\psi H^{NLOS}_{org,u,s}(\tau, t) - \sin\psi H^{NLOS}_{org,u\prime,s}(\tau, t) \\ \sin\psi H^{NLOS}_{org,u,s}(\tau, t) + \cos\psi H^{NLOS}_{org,u\prime,s}(\tau, t) \end{bmatrix} \quad (33)$$

Under single polarization transmission, the relationship between original and rotated channels is simplified as a channel amplitude loss and a phase shift, as shown in Equation (34) below, which is in accordance with polarization loss factor.

$$H^{NLOS}_{rot,u,s}(\tau, t) = \cos\psi e^{j\Gamma} AR H^{NLOS}_{org,u,s}(\tau, t) \quad (34)$$

The rotated cross polar channel $H_{rot}(\tau, t)$ may be derived as Equation (35) below.

$$H_{rot}(\tau, t) = \sqrt{\frac{1}{K_R+1}} \left( \sum_{n=1}^{2} \sum_{i=1}^{3} \sum_{m \in R_i} AR_{n,m} \begin{bmatrix} \cos\psi_{n,m} & -\sin\psi_{n,m} \\ \sin\psi_{n,m} & \cos\psi_{n,m} \end{bmatrix} e^{j\Gamma_{n,m}} H^{NLOS}_{org,n,m}(t) \delta(\tau - \tau_{n,i}) + \sum_{n=3}^{N} AR_n \begin{bmatrix} \cos\psi_n & -\sin\psi_n \\ \sin\psi_n & \cos\psi_n \end{bmatrix} e^{j\Gamma_n} H^{NLOS}_{org,n}(t) \delta(\tau - \tau_n) \right) + \sqrt{\frac{K_R}{K_R+1}} AR_{LOS} \begin{bmatrix} \cos\psi_{LOS} & -\sin\psi_{LOS} \\ \sin\psi_{LOS} & \cos\psi_{LOS} \end{bmatrix} e^{j\Gamma_{LOS}} H^{LOS}_{org}(t) \delta(\tau - \tau_1) \quad (35)$$

The analog channel recovery including angle-domain sparse property for a CDL channel model may be derived using compressive sensing algorithms. Following CDL channel modelling as provided in Equations (14) to (20), an antenna array response vector for angles of arrival θ and φ is $a_{MN\times 1}(\{\theta, \varphi\})=\{a_{mn}(\theta, \varphi); m=1, \ldots, M, n=1, \ldots, N\}$, as shown in Equation (36) below.

$$a_{mn}(\theta, \varphi) = \exp\left(-j\frac{2\pi}{\lambda}(m-1)d_v\cos(\theta)\right)\times\exp\left(-j\frac{2\pi}{\lambda}(n-1)d_H\sin(\varphi)\right) \tag{36}$$

Antenna array response vector $a_{mn}(\theta, \varphi)$ is a part of channel path gain and is denoted by $$e^{\frac{j2\pi\hat{r}^T_{rx,n,m}\cdot\overline{d}_{rx,u}}{\lambda_0}}$$

in Equations (14) to (20).

Given beamforming codebook at UE contains L sets of quantized values of AOA and ZOA as $\{\overline{\theta,\varphi}\}_1, \ldots, \{\overline{\theta,\varphi}\}_L\}$, Equation (37) is defined below.

$$A = [a(\{\overline{\theta, \varphi}\}_1), \ldots, a(\{\overline{\theta, \varphi}\}_L)]_{MN\times L} \tag{37}$$

The analog CDL channel H, as defined in Equations (14) to (20) may be rewritten as Equation (38) below.

$$H_{MN\times N_{TX}} = A_{MN\times L}S_{L\times N_{TX}} \tag{38}$$

In Equation (38), $N_{TX}$ is the number of TX antennas and matrix S is a coefficient matrix with very few number of non-zero rows compared with its total number of rows. The received signal Y at UE is modelled as Equation (39) below.

$$Y = WH + n \tag{39}$$

In Equation (39), W is a UE beamforming vector as defined in Equation (6), H is an analog CDL channel as defined in Equations (14) to (20) and n is additive white Gaussian noise. Replacing Equation (38) in Equation (39), can formulate the channel recovery problem as Equation (40) below.

$$\min_S \|Y - \Phi S\|_F \text{ s.t. } \|S\|_0 \le L \tag{40}$$

In Equation (40), Φ=WA and $\|S\|_0$ denotes the number of non-zero rows in S.

Equation (29) may be derived in a continuous time domain where each cluster n (and all the rays inside that cluster) is distinguishable from other clusters by a specific arrival delay. Depending on a channel delay spread and a UE sample rate, multiple clusters may be discretized into the same time domain channel tap as seen at the UE and this may degrade MSE performance for rotated channel estimation.

Beam management and tracking mechanisms at the UE may be improved with prior knowledge of the UE's position and/or rotation angles through its motion sensors. The UE is able to correct its beamforming or steering angle toward a best direction as it moves or rotates. A new RX beam may be predicted or estimated only based on an observation of previous channel measurements from beam management and with knowledge of a UE rotation angle with acceptable MSE performance.

Figures 8, 9:
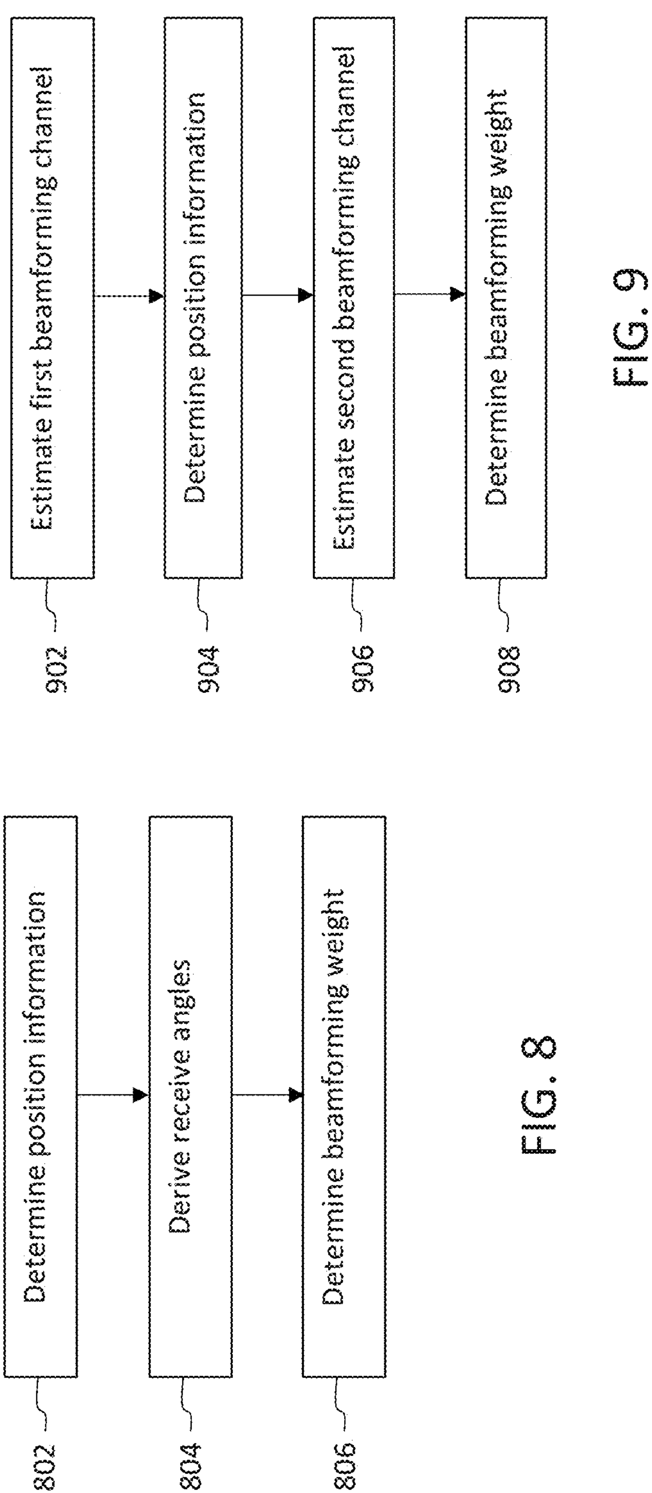
FIG. 8 is a flowchart illustrating a beamforming method, according to an embodiment.
FIG. 9 is a flowchart illustrating a beamforming method, according to an embodiment.

FIG. 8 is a flowchart illustrating a beamforming method, according to an embodiment. At 802, position information is determined, which corresponds to movement of a UE from first local coordinates to second local coordinates. The position information may include at least one of a rotation and a displacement of the UE. The position information may be measured by at least one of a gyroscope, an accelerometer, and a geo-magnetic sensor of the UE.

At 804, receive angles of the UE are derived from the position information. In the case of UE blindness for one of the receive angles, a uniform distribution for one of the receive angles may be averaged. The receive angels of the UE may include a zenith angle of arrival of the UE and an azimuth angle of arrival of the UE.

At 806, a beamforming weight of the UE is determined based on the derived receive angles of the UE. The beamforming weight is configured such that a beam direction associated with the second local coordinates matches a beam direction associated with the first local coordinates. A steering angle of the UE may be updated based on the beamforming weight. The steering angle corresponds to a direction of highest RSRP. The beamforming weight may be determined by selecting quantized versions of beam indications based on a preset decision metric to minimize misalignment of the beam direction, where the beam indications may be based on the receive angles of the UE. Alternatively, an angle-beam relationship for the UE may be determined based on a known beamforming weight and corresponding receive beams. The beamforming weight may then be determined by deriving quantized versions of beam indications in the updated local coordinates based on the angle-beam relationship, and adjusting the beamforming weight based on the quantized versions of the beam indications.

FIG. 9 is a flowchart illustrating a beamforming method, according to an embodiment. At 902, a first beamforming channel of a UE is estimated associated with first local coordinates. The first beamforming channel may be estimated based on a sensing channel recovery algorithm. At 904, position information is determined that corresponds to movement of the UE from the first local coordinates to second local coordinates.

At 906, a second beamforming channel of the UE is estimated corresponding to the second local coordinates based on the first beamforming channel and the position information. The second beamforming channel may be estimated based on a technique including at least one of maximum likelihood, MMSE, AR modeling, Kalman filtering, and Wiener filtering.

At 908, a beamforming weight for the second local coordinates is determined based on the second beamforming channel and a decision metric. The beamforming weight corresponds to a change in a beam direction associated with the second local coordinates. The beamforming weight may be selected from a codebook based on a decision metric maximizing at least one of RSRP. SINR, and capacity in a beamforming scheme.

Figure 10:
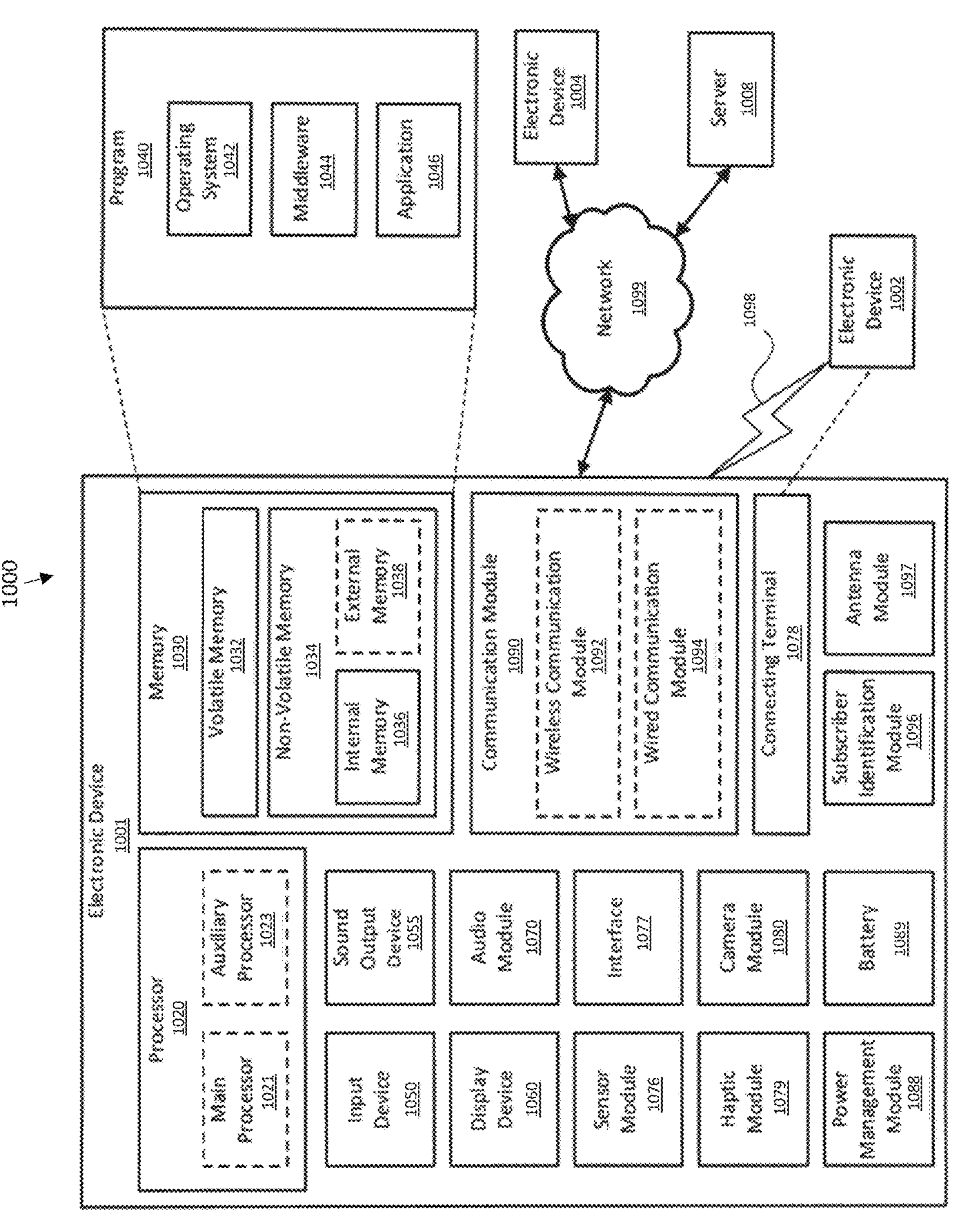
FIG. 10 is a block diagram of an electronic device in a network environment, according to an embodiment.

FIG. 10 is a block diagram of an electronic device in a network environment 1000, according to an embodiment.

Referring to FIG. 10, an electronic device 1001 in a network environment 1000 may communicate with an electronic device 1002 via a first network 1098 (e.g., a short-range wireless communication network), or an electronic device 1004 or a server 1008 via a second network 1099 (e.g., a long-range wireless communication network). The electronic device 1001 may communicate with the electronic device 1004 via the server 1008. The electronic device 1001 may include a processor 1020, a memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) card 1096, or an antenna module 1097. In one embodiment, at least one (e.g., the display device 1060 or the camera module 1080) of the components may be omitted from the electronic device 1001, or one or more other components may be added to the electronic device 1001. Some of the components may be implemented as a single integrated circuit (IC). For example, the sensor module 1076 (e.g., a fingerprint sensor, an iris sensor, or an illuminance sensor) may be embedded in the display device 1060 (e.g., a display).

The processor 1020 may execute software (e.g., a program 1040) to control at least one other component (e.g., a hardware or a software component) of the electronic device 1001 coupled with the processor 1020 and may perform various data processing or computations.

As at least part of the data processing or computations, the processor 1020 may load a command or data received from another component (e.g., the sensor module 1076 or the communication module 1090) in volatile memory 1032, process the command or the data stored in the volatile memory 1032, and store resulting data in non-volatile memory 1034. The processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or execute a particular function. The auxiliary processor 1023 may be implemented as being separate from, or a part of, the main processor 1021.

The auxiliary processor 1023 may control at least some of the functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). The auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034. Non-volatile memory 1034 may include internal memory 1036 and/or external memory 1038.

The program 1040 may be stored in the memory 1030 as software, and may include, for example, an operating system (OS) 1042, middleware 1044, or an application 1046.

The input device 1050 may receive a command or data to be used by another component (e.g., the processor 1020) of the electronic device 1001, from the outside (e.g., a user) of the electronic device 1001. The input device 1050 may include, for example, a microphone, a mouse, or a keyboard.

The sound output device 1055 may output sound signals to the outside of the electronic device 1001. The sound output device 1055 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. The display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. The audio module 1070 may obtain the sound via the input device 1050 or output the sound via the sound output device 1055 or a headphone of an external electronic device 1002 directly (e.g., wired) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. The sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device 1002 directly (e.g., wired) or wirelessly. The interface 1077 may include, for example, a high-definition multimedia interface (HDMI), a universal serial bus (USB) interface, a secure digital (SD) card interface, or an audio interface.

A connecting terminal 1078 may include a connector via which the electronic device 1001 may be physically connected with the external electronic device 1002. The connecting terminal 1078 may include, for example, an HDMI connector, a USB connector, an SD card connector, or an audio connector (e.g., a headphone connector).

The haptic module 1079 may convert an electrical signal into a mechanical stimulus (e.g., a vibration or a movement) or an electrical stimulus which may be recognized by a user via tactile sensation or kinesthetic sensation. The haptic module 1079 may include, for example, a motor, a piezoelectric element, or an electrical stimulator.

The camera module 1080 may capture a still image or moving images. The camera module 1080 may include one or more lenses, image sensors, image signal processors, or flashes. The power management module 1088 may manage power supplied to the electronic device 1001. The power management module 1088 may be implemented as at least part of, for example, a power management integrated circuit (PMIC).

The battery 1089 may supply power to at least one component of the electronic device 1001. The battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the AP) and supports a direct (e.g., wired) communication or a wireless communication. The communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as BLUETOOTH™, wireless-fidelity (Wi-Fi) direct, or a standard of the Infrared Data Association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. The antenna module 1097 may include one or more antennas, and, therefrom, at least one antenna appropriate for a communication scheme used in the communication network, such as the first network 1098 or the second network 1099, may be selected, for example, by the communication module 1090 (e.g., the wireless communication module 1092). The signal or the power may then be transmitted or received between the communication module 1090 and the external electronic device via the selected at least one antenna.

Commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. All or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method comprising:

determining position information corresponding to movement of a user equipment (UE) from first local coordinates to second local coordinates;

deriving receive angles of the UE from the position information of the UE; and determining a beamforming weight of the UE based on the derived receive angles of the UE, wherein the beamforming weight is configured to compensate for a change in a local coordinate system of the UE such that a beam direction associated with the first local coordinates is preserved.

2. The method of claim 1, further comprising updating a steering angle of the UE based on the beamforming weight, the steering angle corresponding to a direction of highest reference signal resource power (RSRP).

3. The method of claim 1, wherein the position information comprises at least one of a displacement and a rotation of the UE, and the position information is measured by at least one of a gyroscope, accelerometer, and geo-magnetic sensor of the UE.

4. The method of claim 1, further comprising averaging a uniform distribution for one or more of the receive angles in case that the one or more of the receive angles are subject to UE blindness.

5. The method of claim 1, wherein the receive angles of the UE comprise a zenith angle of arrival of the UE and an azimuth angle of arrival of the UE.

6. The method of claim 1, wherein determining the beamforming weight comprises selecting quantized versions of beam indications based on a preset decision metric to minimize misalignment of the beam direction, wherein the beam indications are based on the receive angles of the UE.

7. The method of claim 1, further comprising:

determining an angle-beam relationship for the UE based on a known beamforming weight and corresponding receive beams, wherein determining the beamforming weight comprises:

deriving quantized versions of beam indications in the updated local coordinates based on the angle-beam relationship; and determining the beamforming weight based on the quantized versions of the beam indications.

8. A method comprising:

estimating a first beamforming channel of a user equipment (UE) associated with first local coordinates;

determining position information corresponding to movement of the UE from the first local coordinates to second local coordinates;

estimating a second beamforming channel of the UE corresponding to the second local coordinates based on the first beamforming channel and the position information; and determining a beamforming weight for the second local coordinates based on the second beamforming channel and a decision metric, wherein the beamforming weight corresponds to a change in a beam direction associated with the second local coordinates, wherein the first beamforming channel is estimated based on a sensing channel recovery algorithm, and the second beamforming channel is estimated based on a technique including at least one of maximum likelihood, minimum mean square error (MMSE), autoregressive (AR) modeling, Kalman filtering, and Wiener filtering.

9. The method of claim 8, further comprising updating a steering angle of the UE based on the beamforming weight, the steering angle corresponding to a direction of highest reference signal resource power (RSRP).

10. The method of claim 8, wherein the position information comprises at least one of a displacement and a rotation of the UE, and the position information is measured by at least one of a gyroscope, accelerometer, and a geo-magnetic sensor of the UE.

11. The method of claim 8, wherein determining the beamforming weight comprises selecting the beamforming weight from a codebook based on the decision metric maximizing at least one of RSRP, signal-to-interference and noise ratio (SINR), and capacity in a beamforming scheme.

12. The method of claim 8, further comprising averaging a uniform distribution for one or more angles of arrival at different stages of beamforming weight determination in case that the one or more angles of arrival are subject to UE blindness.

13. A user equipment (UE) comprising:

a processor; and a non-transitory computer readable storage medium storing instructions that, when executed, cause the processor to:

determine position information corresponding to movement of the UE from first local coordinates to second local coordinates;

derive receive angles of the UE from the position information of the UE; and determine a beamforming weight of the UE based on the derived receive angles of the UE, wherein the beamforming weight is configured to compensate for a change in a local coordinate system of the UE such that a beam direction associated with the first local coordinates is preserved.

14. The UE of claim 13, wherein the instructions further cause the processor to update a steering angle of the UE based on the beamforming weight, the steering angle corresponding to a direction of highest reference signal resource power (RSRP).

15. The UE of claim 13, further comprising a sensor component including at least one of a gyroscope, accelerometer, and geo-magnetic sensor that measure the position information, wherein the position information comprises at least one of a displacement and a rotation of the UE as measured by the sensor component.

16. The UE of claim 13, wherein the instructions further cause the processor to average a uniform distribution for one or more of the receive angles in case that the one or more of the receive angles are subject to UE blindness.

17. The UE of claim 13, wherein the receive angles of the UE comprise a zenith angle of arrival of the UE and an azimuth angle of arrival of the UE.

18. The UE of claim 13, wherein, in determining the beamforming weight, the instructions further cause the processor to select quantized versions of beam indications based on a preset decision metric to minimize misalignment of the beam direction, wherein the beam indications are based on the receive angles of the UE.

19. The UE of claim 13, wherein:

the instructions further cause the processor to determine an angle-beam relationship for the UE based on a known beamforming weight and corresponding receive beams; and in determining the beamforming weight, the instructions further cause the processor to:

derive quantized versions of beam indications in the updated local coordinates based on the angle-beam relationship; and determine the beamforming weight based on the quantized versions of the beam indications.

* * * * *